United States Patent
Choi et al.

(10) Patent No.: US 10,209,933 B2
(45) Date of Patent: Feb. 19, 2019

(54) IMAGE FORMING DEVICE, METHOD FOR WIRELESS CONNECTION FOR SAME, AND ELECTRONIC DEVICE

(71) Applicant: S-Printing Solution Co., Ltd., Suwon-si, Gyeonggi-do (KR)

(72) Inventors: Chang-seok Choi, Suwon-si (KR); Yong-im Kim, Suwon-si (KR); Sung-jae Kim, Suwon-si (KR); Hye-soo Kim, Suwon-si (KR); Yeon-hee Jung, Seoul (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 0 days.

(21) Appl. No.: 15/314,238

(22) PCT Filed: Jun. 4, 2015

(86) PCT No.: PCT/KR2015/005613
§ 371 (c)(1),
(2) Date: Nov. 28, 2016

(87) PCT Pub. No.: WO2015/186980
PCT Pub. Date: Dec. 10, 2015

(65) Prior Publication Data
US 2017/0192725 A1    Jul. 6, 2017

(30) Foreign Application Priority Data

Jun. 5, 2014 (KR) .................. 10-2014-0068186
Jun. 5, 2014 (KR) .................. 10-2014-0068648
May 20, 2015 (KR) .................. 10-2015-0070463

(51) Int. Cl.
*G06F 3/12* (2006.01)
*H04M 1/725* (2006.01)
(Continued)

(52) U.S. Cl.
CPC .......... *G06F 3/1236* (2013.01); *G06F 3/1204* (2013.01); *G06F 3/1205* (2013.01);
(Continued)

(58) Field of Classification Search
USPC ........................................................ 358/1.15
See application file for complete search history.

(56) References Cited

U.S. PATENT DOCUMENTS 5,140,439 A * 8/1992 Tanaka ............... H04N 1/00488
358/405
2009/0187665 A1 * 7/2009 Ozawa .................... G06F 17/30
709/228

(Continued)

FOREIGN PATENT DOCUMENTS

JP          11-119974 A      4/1999
JP       2002-331712 A      11/2002
(Continued)

*Primary Examiner* — Ngon B Nguyen
(74) *Attorney, Agent, or Firm* — Jefferson IP Law, LLP

(57) ABSTRACT

Disclosed is an image forming device which can be connected to an electronic device. An image forming device comprises: a speaker; a storage unit for storing connection information necessary for connection to the image forming device; a control unit for controlling, in case of a predetermined condition, a speaker so as to output sound that corresponds to the connection information; and a wireless connection unit for, if a wireless connection request with respect to the connection information is received, connecting by means of Wi-Fi Direct to an electronic device which transmitted the wireless connection request.

18 Claims, 19 Drawing Sheets

(51) Int. Cl.
*H04N 1/00* (2006.01)
*H04W 40/24* (2009.01)

(52) U.S. Cl.
CPC .......... *G06F 3/1207* (2013.01); *G06F 3/1225* (2013.01); *G06F 3/1229* (2013.01); *G06F 3/1238* (2013.01); *G06F 3/1284* (2013.01); *G06F 3/1292* (2013.01); *G06F 3/1296* (2013.01); *H04M 1/7253* (2013.01); *H04N 1/00214* (2013.01); *H04N 1/00307* (2013.01); *H04W 40/246* (2013.01); *H04N 2201/0075* (2013.01)

(56) References Cited

U.S. PATENT DOCUMENTS

| | | | | |
|---|---|---|---|---|
| 2012/0326962 | A1* | 12/2012 | Asai | H04N 1/00474 345/156 |
| 2013/0073748 | A1* | 3/2013 | Masuda | H04R 27/00 710/15 |
| 2014/0118776 | A1 | 5/2014 | Lee | |

FOREIGN PATENT DOCUMENTS

| JP | 2011-248118 A | 12/2011 |
|---|---|---|
| JP | 2014-002648 A | 1/2014 |
| KR | 10-2014-0054779 A | 5/2014 |

\* cited by examiner

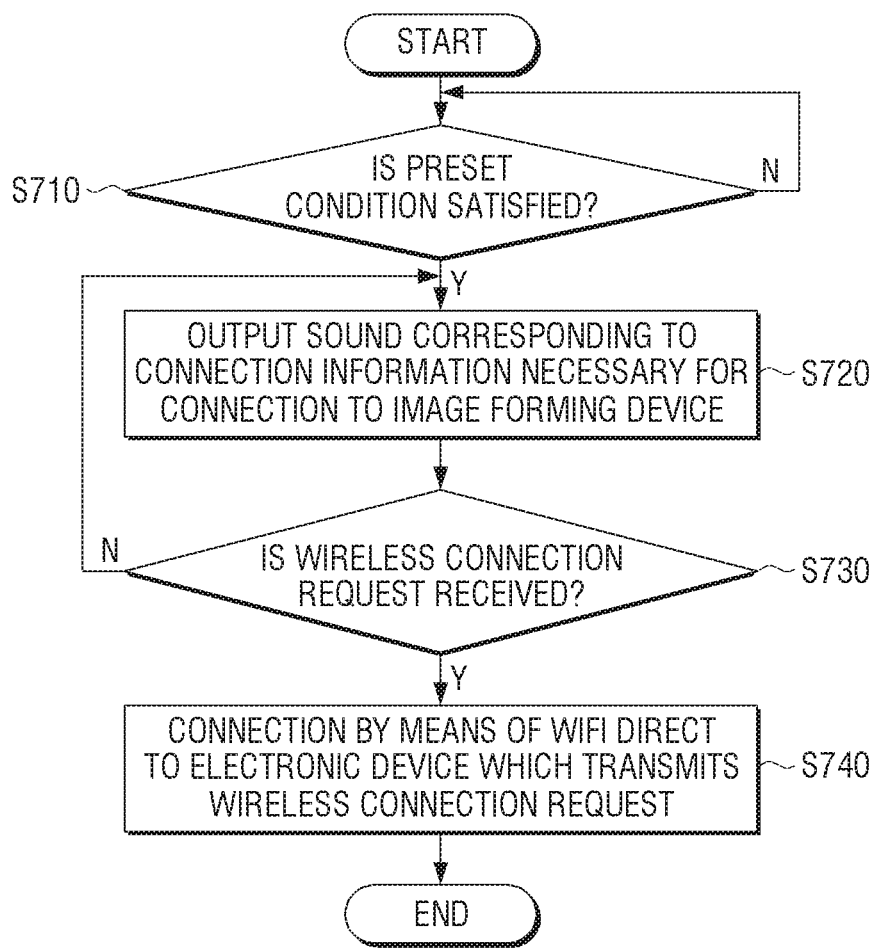

FIG. 12

<EXAMPLE OF PJL>

| SAMSUNG PCL6 Universal Driver | |
|---|---|
| HOST NAME INFORMATION<br>DRIVER MANUFACTURER | @PJL COMMENT USERNAME="xxx"<br>@PJL COMMENT SAMSUNG PCL XL Driver |

| SHARB PCL6 Universal Driver | |
|---|---|
| HOST NAME INFORMATION<br>DRIVER MANUFACTURER<br>Driver Name | @PJL SET PCNAME="NO-XXX-PC1"<br>@PJL SET DRIVERNAME="SHARB"<br>@PJL SET USERNAME="xxx" |

<EXAMPLE OF DSC>

| XEROS PS Universal Driver | |
|---|---|
| HOST NAME INFORMATION<br>DRIVER MANUFACTURER | %%For:xxx<br>%%DriverName:Xeros Global Print Driver PS |

IMAGE FORMING DEVICE, METHOD FOR WIRELESS CONNECTION FOR SAME, AND ELECTRONIC DEVICE

TECHNICAL FIELD

The present invention relates to an image forming device, a method for a wireless connection for the same, and an electronic device, and more particularly, to an image forming device that performs a WIFI DIRECT connection with an electronic device by using a sound, a method for a wireless connection for the same, and an electronic device.

BACKGROUND ART

With the population of an electronic device, data that is stored or displayed in the electronic device has been printed through an image forming device. In particular, an electronic device that is small and mobile may control printing in any place, where an image forming device is located, by using the image forming device. For this, the electronic device may be wirelessly connected to the image forming device.

In order to enable the electronic device to be connected to the image forming device by means of WIFI DIRECT, the electronic device may know connection information of the image forming device. The connection information may include a product name (or a model name), an MAC address, a PIN number, etc. and may be stored on a Near Field Communication (NFC) tag. Also, the NFC tag is generally attached onto a side of the image forming device.

Therefore, if the electronic device including an NFC reader is located near to the image forming device, the NFC reader communicates the NFC tag attached onto the image forming device to read the connection information. As a result, the electronic device is wirelessly connected to the image forming device by using the read connection information.

However, NFC tags are not attached onto all types of image forming devices that are currently launched, but NFC tags are attached merely onto high-priced image forming devices having high-quality specifications. Therefore, a wireless connection method as described above is not used. Also, if the electronic device does not include the NFC reader, the above-described wireless connection method is not used. As a result, since there is no method of knowing connection information of an image forming device, the electronic device may not be wirelessly connected to the image forming device. Therefore, even if printing is required, the image forming device is not used. As a result, there is a need for a method of wirelessly connecting an image forming device not having an NFC function and an electronic device.

In general, the image forming device refers to a device, which prints printing data generated from a terminal device, such as a computer, on a recording sheet. Examples of the image forming device may include a copier, a printer, a fax machine, a Multi Function Peripheral (MFP) that complexly realizes functions of the copier, the printer, and the fax machine through one device, etc.

An enterprise or a government office frequently operates several or dozens of image forming devices. If a new image forming device is installed in this enterprise or government office environment, a manager may directly install a printer driver of the new image forming device in a small-scale enterprise. However, a large-scale enterprise has induced installations through an e-mail, a bulletin board announcement, or the like.

However, this announcement is easily ignored or overlooked, and thus the new image forming device is frequently used through a printer driver of an existing image forming device. Therefore, an error and an installation inquiry of the printer driver frequently occur during printing, and thus it is difficult for the manager to manage the new image forming device.

Therefore, there is a need for a method of easily naturally inducing a printer driver installation without an additional announcement of a manager even if a new image forming device is installed.

DETAILED DESCRIPTION OF THE INVENTION

Technical Problem

The present invention provides an image forming device that supports a WIFI DIRECT connection of an electronic device by using a sound so as to be connected to a mobile device by means of WIFI DIRECT even if an NFC function is not supported, and an operating method thereof.

The present invention also provides an image forming device that provides a printer driver of the image forming device to a user by using printing data received from a host device, and a method of providing the printer driver thereof.

Technical Solution

According to an aspect of the present invention, an image forming device connectable to an electronic device, includes a speaker, a storage unit for storing connection information necessary for wireless connection to the electronic device, a control unit for, in case of a preset condition, controlling the speaker to output a sound corresponding to the connection information in a preset frequency band supported by the speaker, a communication unit for, if a wireless connection request with respect to the connection information is received from the electronic device receiving the sound, forming a wireless connection link with the electronic device which transmits the wireless connection request, and a printing unit for printing printing data received through the formed wireless connection link.

In case of one of a case where power of the image forming device is turned on, a case where a user command of an output of the connection information is input, and a case where a period associated with the output of the connection information elapses, the control unit may control the speaker to output the sound.

If the wireless connection request is not received for a preset time after initially outputting the sound through the speaker, the control unit may control the speaker to output the sound by increasing a volume level of the sound.

If an error occurs in the image forming device, the control unit may control the speaker to output a sound corresponding to the error in a preset frequency band supported by the speaker.

The storage unit may store contact information of a plurality of users. The image forming device may further include a fax unit for receiving fax data and notifying the receiving of the fax data to the electronic device corresponding to sending information of the received fax data based on the contact information.

The control unit may control the wireless communication unit to transmit the fax data received through the fax unit to a preset URL and control the fax unit to notify information on the URL storing the fax data to an electronic device corresponding to sending information of the received fax data.

The image forming device may further include a scanning unit for generating scan data by scanning a document. If the scan data is generated by a scan job of the scanning unit, the control unit may control the speaker to output a sound indicating that the scan job is completed.

The connection information may be address information on an URL including a Media Access Control (MAC) address of the image forming device, a Personal Identification Number (PIN), and passwords set by a user.

The image forming device may further include a microphone for recording a sound. The control unit may analyze the sound recorded through the microphone and, if the sound is a sound corresponding to a preset control command, perform an operation according to the preset control command.

The sound may be an inaudible frequency band sound.

According to another aspect of the present invention, an electronic device connectable to an image forming device, includes a microphone, a wireless communication unit, and a control unit for, if a sound corresponding to connection information necessary for connection to the image forming device is recorded through the microphone, extracting the connection information by analyzing the recorded sound and transmitting a wireless connection request to the image forming device by using the extracted connection information to form a wireless connection link between the image forming device and the electronic device.

The connection information may be address information on an URL including a Media Access Control (MAC) address of the image forming device, a Personal Identification Number (PIN), and passwords set by a user.

According to another aspect of the present invention, a wireless connection method of an image forming device, includes, in case of a preset condition, outputting a sound corresponding to connection information necessary for connection to the image forming device in a preset frequency band supported by a speaker through the speaker, if a wireless connection request with respect to the connection information is received from the electronic device receiving the sound, forming a wireless connection link with the electronic device which transmits the wireless connection request, and if printing data is received through the formed wireless connection link, outputting the received printing data.

In case of one of a case where power of the image forming device is turned on, a case where a user command of an output of the connection information is input, and a case where a period associated with the output of the connection information elapses, the outputting the sound may comprise outputting the sound through the speaker.

If the wireless connection request is not received for a preset time after initially outputting the sound through the speaker, the outputting the sound may comprise outputting the sound by increasing a volume level of the sound.

The wireless connection method may further include, if an error occurs in the image forming device, outputting a sound corresponding to the error through the speaker.

The connection information may be address information on an URL including a Media Access Control (MAC) address of the image forming device, a Personal Identification Number (PIN), and passwords set by a user.

The wireless connection method may further include recording a sound output from an outside of the image forming device, analyzing the sound recorded through the microphone, and, if the sound is a sound corresponding to a preset control command, performing an operation according to the preset control command.

The sound may be an inaudible frequency band sound.

According to another aspect of the present invention, a computer readable recording medium includes a program for executing a wireless connection method of an electronic device. The wireless connection method may include recording a sound corresponding to connection information necessary for connection to the image forming device through a microphone, extracting the connection information by analyzing the recorded sound, and transmitting a wireless connection request to the image forming device by using the extracted connection information in order to form a wireless connection link between the image forming device and the electronic device.

According to another aspect of the present invention, an image forming device includes a communication unit for receiving printing data from a host device and a control unit for detecting printer driver information and characteristic information of the host device from the printing data, and if the printer driver information is inappropriate for the image forming device, providing an installation file of a printer driver corresponding to the image forming device or a link address, where the installation file is stored, to an address corresponding to the characteristic information.

The control unit may generate a list of host devices where a printer driver inappropriate for the image forming device is installed and provide the list to a manager through the communication unit at every preset period.

The printer driver information may include manufacturer information, and if the manufacturer information does not correspond to manufacturer information of the image forming device, the control unit may determine that the printer driver information is inappropriate for the image forming device.

The address corresponding to the characteristic information may be at least one of an e-mail address which is to receive the installation file or the link address and a server address which is to store the installation file or the link address.

The control unit may generate a configuration file based on an attribute value of the image forming device and add the configuration file to the installation file.

A printer driver installation file of the image forming device may be stored in an external server, and if the printer driver information is inappropriate for the image forming device, the control unit may transmit the characteristic information to the external server so as to enable the external server to provide the installation file or the link address to the address corresponding to the characteristic information.

The image forming device may further include a display unit. If the printer driver information is inappropriate for the image forming device, the control unit may control the display unit to display a UI screen for guiding a printer driver installation of the image forming device.

The image forming device may further include an output unit for outputting printing data. If the printer driver information is inappropriate for the image forming device, the control unit may output a printer driver installation manual of the image forming device along with the printing data through the output unit.

If a preset event occurs, the control unit may control the display unit to display a UI screen for guiding a printer driver installation of the image forming device. The event may be one of an event where a user authentication with respect to a particular user is initially performed, an event where the host device is initially recognized in the image forming device, and an event where the printing data is received or the user authentication is performed within a preset period after an initial operation of the image forming device.

If an e-mail transmission menu is selected on the UI screen, the control unit may transmit the link address, where the printer driver installation file of the image forming device is stored, to an e-mail address corresponding to characteristic information of the host device through the communication unit. If a PC transmission menu is selected on the UI screen, the control unit may transmit the printer driver installation file of the image forming device to a server address corresponding to the characteristic information of the host device through the communication unit. If a USB menu is selected on the UI screen, the control unit may transmit the printer driver installation file of the image forming device to a USB inserted into a USB input port. If a manual output menu is selected on the UI screen, the control unit may output a manual for installing a printer driver of the image forming device.

According to another aspect of the present invention, a method of providing a printer driver of an image forming device, includes receiving printing data from a host device, detecting printer driver information and characteristic information of the host device from the printing data, and if the printer driver information is inappropriate for the image forming device, providing an installation file of the printer driver corresponding to the image forming device or a link address, where the installation file is stored, to an address corresponding to the characteristic information.

The method may further include generating a list of host devices where a printer driver inappropriate for the image forming device is installed and providing the list to a manager at every preset period.

The printer driver information may include manufacturer information, and the method may further include, if the manufacturer information does not correspond to manufacturer information of the image forming device, determining that the printer driver information is inappropriate for the image forming device.

The address corresponding to the characteristic information may be at least one of an e-mail address which is to receive the installation file or the link address and a server address which is to store the installation file or the link address.

The method may further include generating a configuration file based on an attribute value of the image forming device and adding the configuration file to the installation file.

The printer driver installation file of the image forming device may be stored in the external server, and if the printer driver information is inappropriate for the image forming device, the providing of the driver may include transmitting the characteristic information to the external server so as to enable the external server to provide the installation file or the link address to the address corresponding to the characteristic information.

The method may further include, if the printer driver information is inappropriate for the image forming device, displaying a UI screen for guiding a printer driver of the image forming device.

The method may further include, if the printer driver information is inappropriate for the image forming device, outputting a printer driver installation manual of the image forming device along with the printing data.

The method may further include, if a preset event occurs, displaying a UI screen for guiding a printer driver installation of the image forming device. The event may be one of an event where a user authentication with respect to a particular user is initially performed, an event where the host device is initially recognized in the image forming device, and an event where the printing data is received or the user authentication is performed within a preset period after an initial operation of the image forming device.

The method may further include, if an e-mail transmission menu is selected on the UI screen, transmitting a link address, where a printer driver installation file of the image forming device is stored, to an e-mail address corresponding to the characteristic information of the host device, if a PC transmission menu is selected on the UI screen, transmitting the printer driver installation file of the image forming device to a server address corresponding to the characteristic information of the host device, if a USB menu is selected on the UI screen, transmitting the printer driver installation file of the image forming device to a USB inserted into a USB input port, and if a manual output menu is selected on the UI screen, outputting a manual for installing the printer driver of the image forming device.

Advantageous Effects of the Invention

According to various exemplary embodiments described above, although an NFC function is not supported, a mobile device and an image forming device may be connected to each other by means of WIFI DIRECT. Also, efforts of a manager to install a printer driver of a new image forming device may be saved, a printing error may be minimized, and a user may easily install the printer driver.

BRIEF DESCRIPTION OF THE DRAWINGS

FIG. 7 is a flowchart of a wireless connection method of an image forming device according to an exemplary embodiment of the present invention.

FIG. 12 illustrates printing data received by an image forming device, according to an exemplary embodiment of the present invention.

MODE OF THE INVENTION

Hereinafter, an exemplary embodiment of the present invention will be described in more detail with reference to the attached drawings. However, in the description of the present invention, detailed descriptions of associated well-known functions or elements may be omitted if they are determined as making the essentials of the present invention obscure.

Figure 1:
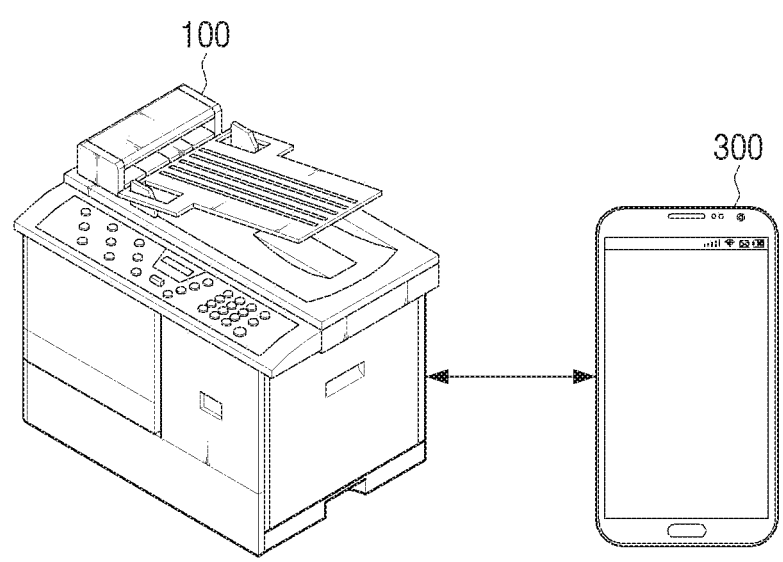
FIG. 1 illustrates an image forming system according to an exemplary embodiment of the present invention.

FIG. 1 illustrates an image forming system according to an exemplary embodiment of the present invention. Referring to FIG. 1, the image forming system includes an image forming device 100 and an electronic device 300.

The image forming device 100 may be a printer, a copier, a scanner, a fax machine, a Multi Function Peripheral (MFP) that complexly realizes functions thereof through one device, or the like. Also, the electronic device 300 may be a notebook computer including a display unit, a portable phone, a smartphone, or a tablet PC, i.e., a mobile device.

A wireless connection link may be formed between the image forming device 100 and the electronic device 300 so as to enable a user to print data stored in the electronic device 300 or documents displayed on a screen of the electronic device 300 by using the image forming device 100. Here, the wireless connection may be a WIFI DIRECT link. If the electronic device 300 is connected to the image forming device 100 by means of WIFI DIRECT, the electronic device 300 directly communicates with the image forming device without using an additional Access Point (AP).

In order to form the wireless connection link between the electronic device 300 and the image forming device 100, connection information necessary for connection of the image forming device 100 is required. Here, the connection information may include a Media Access Control (MAC) address, a Personal Identification Number (PIN), and passwords set by the user.

If a preset condition is satisfied, the image forming device 100 outputs a sound corresponding to the connection information in a preset frequency band, which is supported by a speaker, through the speaker. In other words, the image forming device 100 may load and output the Media Access Control (MAC) address, the Personal Identification Number (PIN), and the passwords set by the user in the sound.

However, the present invention is not limited thereto, and information on an URL storing the connection information may be loaded and output in the sound. The sound has a transmission speed between several kbps and dozens of kbps and is affected by surrounding noise. Therefore, when considering the transmission speed and an error occurrence rate caused by a sound analysis of the electronic device 300, the sound may have a short data length. Therefore, if a length of the connection information to be loaded in the sound becomes longer, pieces of connection information may be uploaded to an URL, and the information on the URL may be loaded and output in the sound.

The electronic device 300 may include a microphone for recording the sound. The electronic device 300 may record the sound output from the image forming device 100 and extract the connection information necessary for the connection of the image forming device 100 from the sound. Therefore, the electronic device 300 transmits a wireless connection request including the connection information to the image forming device 100.

If the image forming device 100 is required to be used, the electronic device 300 may activate a recording function of the microphone. This may be executed by an application stored in the electronic device 300. In detail, the electronic device 300 may store an application for extracting information from the sound output from the image forming device 100.

Therefore, when the user wants to use a printing function of the image forming device 100, the user may input an application execution command stored in the electronic device 300, and the electronic device 300 may execute the application according to the input command. As described above, the electronic device 300 may record the sound by activating the recording function of the microphone while the application is executed. In this case, the application is a program that is developed by a manufacturer of the image forming device 100 or developers making contracts with the manufacturer of the image forming device 100 and may analyze sounds output from the image forming device 100 to extract information.

As described above, in order to analyze a sound output from the image forming device 100, the electronic device 300 may download an application corresponding to the image forming device 100 through an official process. Therefore, although devices that do not store the corresponding application record a sound, the devices may not extract information from the sound.

If a wireless connection request is received, the image forming device 100 compares connection information included in the wireless connection request with connection information of the image forming device 100 and, if two pieces of the connection information correspond to each other, forms a wireless connection link with the electronic device 300.

Therefore, although the image forming device 100 or the electronic device 300 illustrated in FIG. 1 does not include a Near Field Communication (NFC) module (e.g., an NFC tag, an NFC reader), the image forming device 100 or the electronic device 300 may transmit and receive connection information by using a sound so as to form a wireless connection link.

Figure 2:
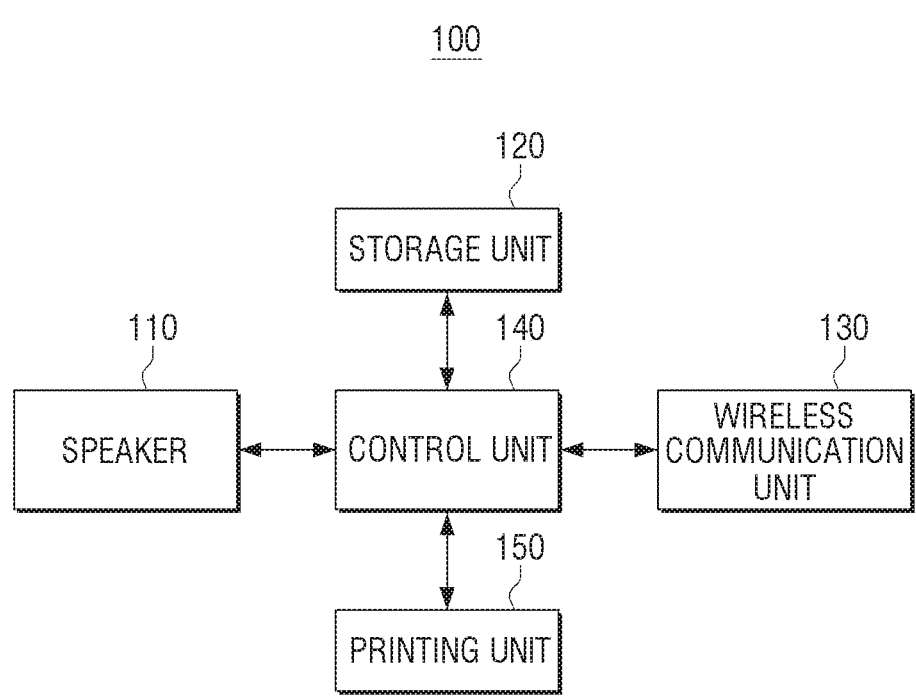
FIG. 2 is a block diagram of a configuration of an image forming device according to an exemplary embodiment of the present invention.

FIG. 2 is a block diagram of a configuration of an image forming device according to an exemplary embodiment of the present invention. Referring to FIG. 2, an image forming device 100 includes a speaker 110, a storage unit 120, a wireless storage unit 130, a control unit 140, and a printing unit 150.

The speaker 110 outputs a sound in a preset frequency band supported by the speaker.

The storage unit 120 stores information and programs necessary for an operation of the image forming device 100. Also, the storage unit 120 according to the present invention stores connection information necessary for connection of the image forming device 100.

The wireless communication unit 130 performs a wireless communication through a wireless connection link formed with another device.

The control unit 140 controls an operation of the image forming device 100. In the following description, a control unit (e.g., the control unit 140) may be composed of a known processor such as a central processing unit (CPU).

If a preset condition is satisfied, the control unit 140 controls the speaker 110 to output a sound corresponding to connection information necessary for the connection of the image forming device 100.

Here, the preset condition may be one selected from a case where power of the image forming device 100 is changed from an off state into an on state, a case where a user command of an output of the connection information is input, and a case where a period associated with the output of the connection information elapses.

The user command of the output of the connection information may be input by a method of pressing an information output button included in a main body of the image forming device 100 by a user or selecting an information output function displayed through a UI screen window of the image forming device 100 by the user.

Also, if the period associated with the output of the connection information is set to 5 minutes, the control unit 140 may control the speaker 110 to re-output the connection information if 5 minutes elapses after outputting the connection information.

A sound output through the speaker 110 may be an audible frequency band sound or an inaudible frequency band sound. The audio frequency band sound may have a frequency of a sound audible by a person, i.e., may be a sound between 20 Hz and 20 kHz. Also, the inaudible frequency band sound may have a frequency of a sound inaudible by the person, i.e., may be a sound between 10 kHz and 300 GHz.

If a wireless connection request is received through the wireless communication unit 130, the control unit 140 controls the wireless communication unit 130 to form a wireless connection link with the electronic device 300 that transmits the wireless connection request. Here, the wireless connection request may include connection information. Therefore, the control unit 140 may compare the connection information included in the wireless connection request with connection information stored in the storage unit 120, if two pieces of the connection information correspond to each other, may form a wireless connection link, and if the two pieces of the connection information do not correspond to each other, reject a wireless connection.

The printing unit 150 is an element that prints printing data received through the wireless connection link formed as described above.

As described above, although there is no NFC tag, the image forming device 100 may output a sound corresponding to connection information thereof. Also, if a job performance command is received from the electronic device 300 with which the wireless connection link is formed, the image forming device 100 may perform a job.

Figure 3:
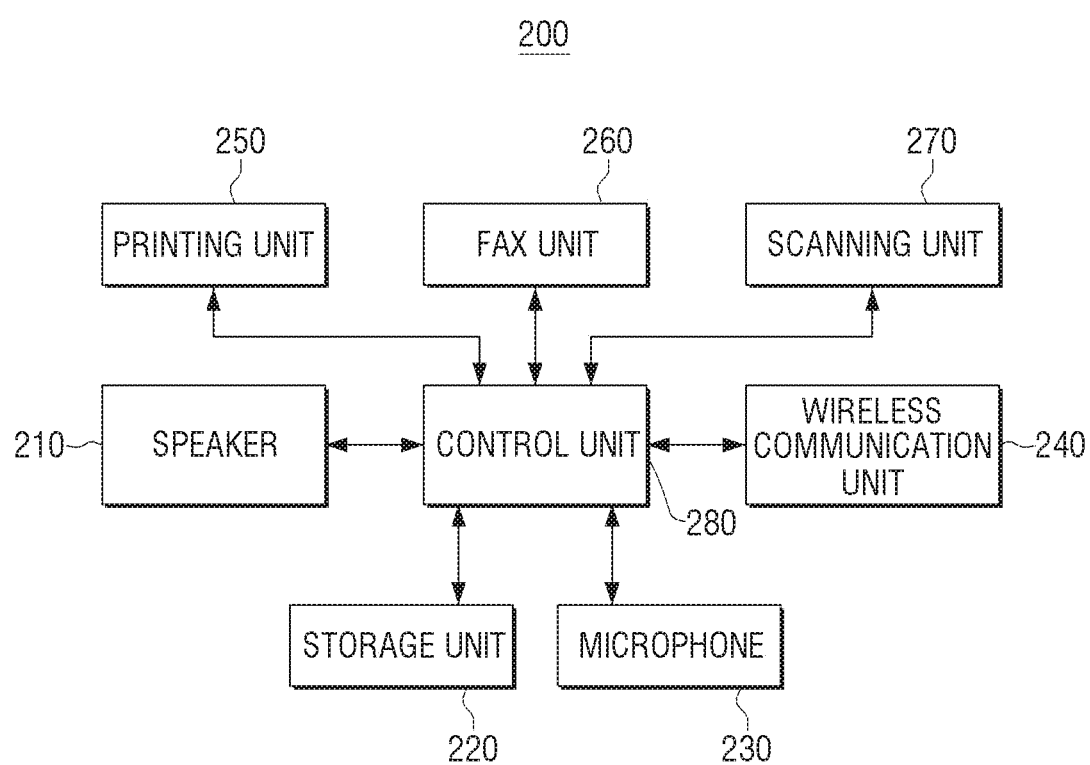
FIG. 3 is a block diagram of a configuration of an image forming device according to another exemplary embodiment of the present invention.

FIG. 3 is a block diagram of a configuration of an image forming device according to another exemplary embodiment of the present invention. Referring to FIG. 3, an image forming device 200 includes a speaker 210, a storage unit 220, a microphone 230, a wireless storage unit 240, a printing unit 250, a fax unit 260, a scanning unit 270, and a control unit 280.

The speaker 210 outputs a sound.

The storage unit 220 stores information and programs necessary for an operation of the image forming device 200. Also, the storage unit 220 according to the present invention stores connection information necessary for connection of the image forming device 100. In this case, the storage unit 120 may store sound information corresponding to the connection information or may store a program for generating sound information corresponding to the corresponding information.

The microphone 220 records the sound.

The wireless communication unit 240 performs a wireless communication by using a wireless connection link formed with another device.

The printing unit 250 is an engine unit which performs a printing job and may include a photoreceptor, a charging unit, an exposing unit, developing unit, a transferring unit, a fixing unit, etc. However, this is merely an exemplary embodiment and thus may vary according to an image forming method (e.g., an inkjet method or a laser method) of the image forming device 200.

The fax unit 260 may be an engine unit which transmits and receives a faxing job and may include a scanning unit, a communication unit, etc.

The scanning unit 270 scans a document to generate scan data.

The control unit 280 controls an operation of the image forming device 200.

In case of a preset condition, the control unit 280 controls the speaker 210 to output a sound corresponding to connection information of the image forming device 200 in a preset frequency band supported by the speaker 210. This sound may further include device state information associated with the operation of the image forming device 200 and consumable state information associated with a consumable unit installed in the image forming device 200, besides the connection information of the image forming device 200.

Here, the device state information is information indicating a job performable state or a job unperformable state. Also, the consumable state information is information indicating states of consumable units such as a toner used amount (or a toner residual amount), a drum lifespan, etc.

The sound has been described above as including the device state information and the consumable state information besides the connection information. However, the present invention is not limited thereto, and thus a sound corresponding to the connection information, a sound corresponding to the device state information, and a sound corresponding to the consumable state information may be sequentially output.

If a wireless connection request is not received for a preset time after initially outputting a sound corresponding to connection information through the speaker 210, the control unit 280 may control the speaker 210 to increase a volume level of the sound and then output the sound. Therefore, the speaker 210 may sequentially output sounds including the same connection information but having different volume levels.

If the wireless connection request with respect to the connection information is received, the control unit 280 controls the wireless communication unit 240 to form a wireless connection link with an electronic device that transmits the wireless connection request. As described above, if the electronic device forms the wireless connection link with the wireless communication unit 240, the control unit 280 may receive a job performance command through the wireless communication unit 240 and control the printing unit 250 according to the job performance command.

Also, before the job performance command is received, the wireless communication unit 240 may receive a warming-up command of the printing unit 250. The warming-up command is to control heating of the fixing unit (not shown) included in the printing unit 250. A temperature of the fixing unit may be maintained between about 150° C. and about 170° C. in order to perform a printing job. However, when the printing job is not performed, the fixing unit is maintained at a temperature lower than 100° C. Also, an image forming device that is currently launched maintains the fixing unit at a room temperature when the printing job is not performed.

If the fixing unit is maintained at the room temperature as described above, a time taken for heating the fixing unit at the temperature between about 150° C. and 170° C. may become longer, and thus a timing for performing the printing job may become late. Therefore, the printing unit 250 may perform the printing job immediately after receiving the job performance command by pre-heating the fixing unit according to the warming-up command.

The image forming device 200 according to the present invention may output various types of information by using a sound.

If an error occurs in the printing unit 250 while performing a job, the control unit 280 may generate error information and control the speaker 210 to output a sound corresponding to the error information in a preset frequency band supported by the speaker. Here, the error information may include information (model name) about a device where an error occurs, error contents, a solving method, and a service center contact number. Alternatively, the error information may be information on an URL including the information (model name) about the device where the error occurs, the error contents, the solving method, and the service center contact number.

The control unit 280 may control the speaker 210 to output a sound corresponding to the error information repeatedly two or more times. If the sound is output two times, an audible frequency band sound may be output first one time, and an inaudible frequency band sound may be output the reset one time.

Also, if the user presses an error information output button included in a main body of the image forming device 200, the control unit 280 may control the speaker 210 to output a sound corresponding to the error information. Therefore, if an error occurs in the image forming device 200, the user may transmit error information to an A/S center by using a sound by making a phone call and then pressing the error information button.

Also, the A/S center may know the error information of the image forming device 200 by extracting the error information from the sound and provide an error recovery service corresponding to the error information. Here, if an error recovery is possible merely by changing a device setting value, the A/S center may output a sound corresponding to the device setting value. Therefore, the image forming device 200 may record the sound through the microphone 230 and update an existing device setting value by using a device setting value included in the sound.

If the fax unit 260 receives fax data, the fax unit 260 may notify an electronic device associated with the fax data of the reception of the fax data. In this case, the control unit 280 may control an additional communication unit (not shown) to transmit the fax data received through the fax unit 260 to a preset URL.

In the present invention, the storage unit 220 may include contact information of a plurality of users. Therefore, if a preset fax receiving condition is satisfied, the control unit 280 may notify fax reception to contact information corresponding to the fax receiving condition.

Here, the preset condition may be a case where a particular sender sends a fax or a case where a fax is received at a preset time.

In detail, if the fax data is received, the control unit 280 checks sender information of the fax data from the fax unit 260. The sender information of the fax data may be a fax sending number, a fax sender name, or the like. The fax sending number may be received together when receiving the fax data, and the fax sender name may be recognized by an Optical Character Recognition (OCR) module (not shown).

If the fax data is received from "010-1234-5678" when "010-1111-2222" is stored to correspond to fax sending number "010-1234-5678", the control unit 280 may notify "010-1111-2222" of the receiving of the fax data.

Also, if the fax data is received at 1:20 p.m. when a preset time is between 1 p.m. and 2 p.m., and "010-1111-2222" is stored in response to the preset time, the control unit 280 may notify "010-1111-2222" of the receiving of the fax data.

The control unit 280 may control the fax unit 260 or the additional communication unit (not shown) to text information on an URL storing letters or fax data notifying the receiving of the fax data or to make a phone call to "010-1111-2222".

However, the present invention is not limited thereto, and the control unit 280 may control the speaker 210 to output a sound corresponding to a message notifying the receiving of the fax data or a sound corresponding to the information on an URL storing the fax data.

"010-1111-2222" is cited as an example of a contact number for notifying that the fax data is received in the above description, but a plurality of contact numbers may be set. Therefore, the receiving of the fax data may be notified in the unit of group including a plurality of contact numbers.

If scan data is generated by the scanning unit 270, the control unit 280 may control the additional communication unit (not shown) to transmit the scan data to a preset URL. Also, the control unit 280 may control the speaker 210 to output a sound indicating that a scan job of the scanning 270 is completed. Here, the sound may include information on an URL to which the scan data is transmitted. Therefore, an electronic device that records the sound may download the scan data through the information on the URL.

If the sound is recorded by the microphone 230, the control unit 280 may extract information corresponding to the sound by analyzing the sound and perform an operation according to the information. Therefore, the control unit 280 may bidirectionally communicate with an electronic device by using a sound.

For example, if a device setting value is extracted from the sound recorded by the microphone 230, the control unit 280 may update an existing device setting value by using the device setting value included in the sound.

Also, if a URL is extracted from the sound recorded by the microphone 230, the control unit 280 may control the printing unit 250 to print a URL screen by accessing the URL.

If e-mail information to be used for scan-to-e-mail is extracted from the sound recorded by the microphone 230, the control unit 280 may set the scan data generated by the scanning unit 270 to be transmitted to e-mail information.

As described above, although the image forming device 200 does not include an NFC tag, the image forming device 200 may form a wireless connection link with an electronic device by transmitting and receiving connection information by using a sound. Also, the image forming device 200 may bidirectionally communicate with the electronic device by using the sound.

Figure 4:
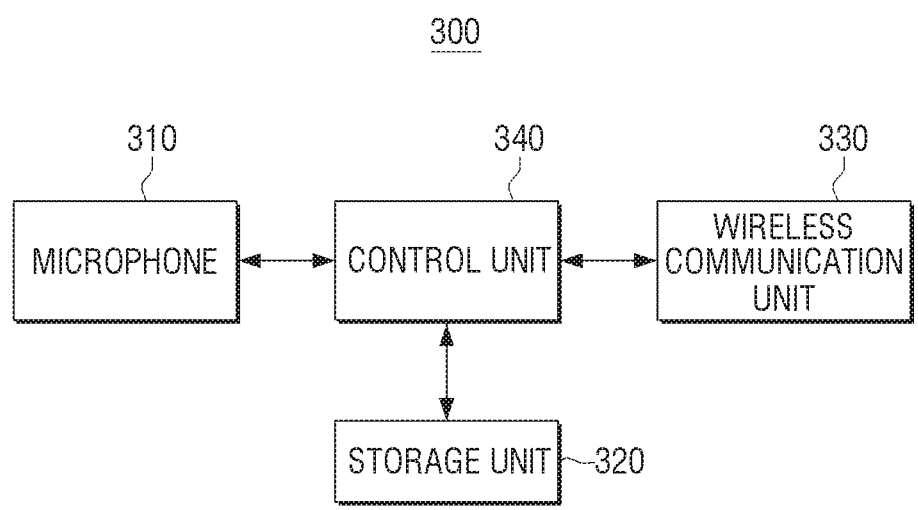
FIG. 4 is a block diagram of a configuration of an electronic device according to an exemplary embodiment of the present invention.

FIG. 4 is a block diagram of a configuration of an electronic device according to an exemplary embodiment of the present invention. Referring to FIG. 4, an electronic device 300 includes a microphone 310, a storage unit 320, a wireless communication unit 330, and a control unit 340.

The microphone 310 records a sound.

The storage unit 320 stores various types of information or programs associated with an operation of the electronic device 300. Also, the storage unit 320 according to the present invention stores an application for extracting information by analyzing a sound.

The wireless communication unit 330 forms a wireless connection link with another device.

The control unit 340 controls an operation of the electronic device 300.

The control unit 340 may record a sound, and the application stored in the storage unit 320 may be executed to extract information from the sound. In detail, if using of the image forming device 100 is required, a user may input an execution command of the application stored in the electronic device 300, and the control unit 340 executes the application according to the execution command.

Here, the application may be a program that is developed by a manufacturer of the image forming device 100 or developers making contracts with the manufacturer of the image forming device 100 and extract merely information of the sound output from the image forming device 100.

Therefore, if the application is stored in the electronic device 300, the information may not be extracted from the sound although the sound is recorded. As described above, if the application is executed, the control unit 340 activates a recording function of the microphone 310.

If a sound corresponding to connection information necessary for connection of the image forming device 100 is recorded by the microphone 310, the control unit 340 extracts the connection information by analyzing the recorded sound. The sound is a frequency signal, i.e., has different frequency signals according to types of information included in the sound, and the connection information may be extracted by analyzing waveforms of the frequency signals.

The control unit 340 transmits a wireless connection request including the extracted connection information to the image forming device 100. The wireless communication unit 330 may be connected to the image forming device 100 by means of WIFI DIRECT according to the wireless connection request.

As described above, although the electronic device 300 does not include an NFC reader, the electronic device 300 may request a wireless connection from the image forming device 100 by receiving the connection information of the image forming device 100 by using a sound.

Figure 5:
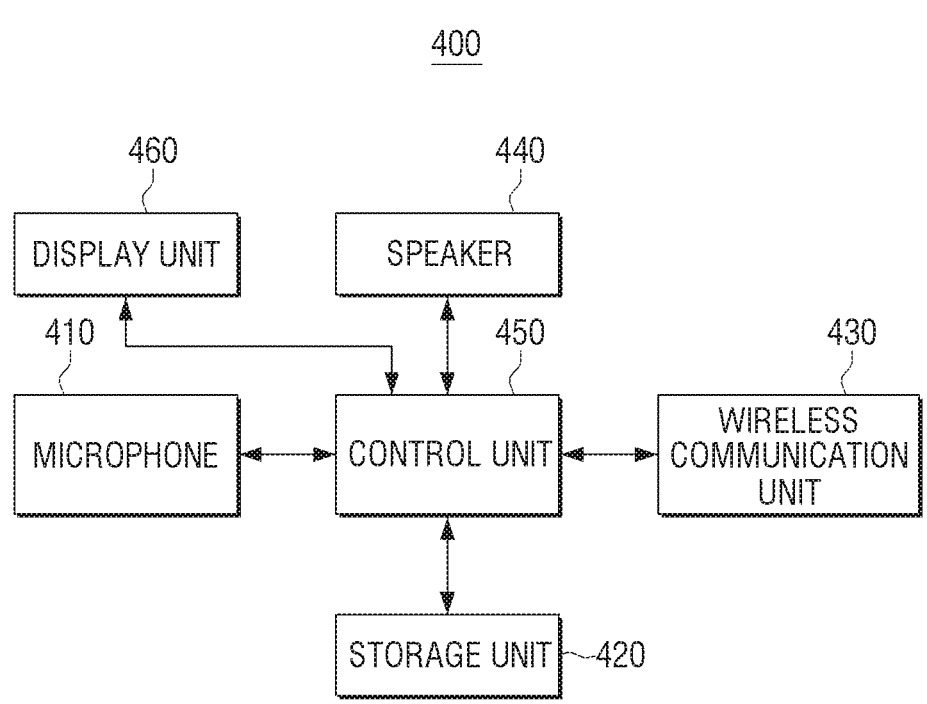
FIG. 5 is a block diagram of a configuration of an electronic device according to another exemplary embodiment of the present invention.

FIG. 5 is a block diagram of a configuration of an electronic device according to another exemplary embodiment of the present invention. Referring to FIG. 5, an electronic device 400 includes a microphone 410, a storage unit 420, a wireless communication unit 430, a speaker 440, a control unit 450, and a display unit 460.

The microphone 410 records a sound.

The storage unit 420 stores various types of information or programs associated with an operation of the electronic device 400. Also, the storage unit 420 according to the present invention stores an application for extracting information by analyzing the sound.

The wireless communication unit 430 performs a WIFI DIRECT connection.

The speaker 440 outputs the sound.

The control unit 450 controls an operation of the electronic device 400.

The control unit 450 extracts connection information of an image forming device by analyzing the sound recorded by the microphone 410. Also, the control unit 450 may control the wireless communication unit 430 to transmit a wireless connection request including the extracted connection information to the image forming device. The wireless communication unit 430 may be connected to the image forming device by means of WIFI DIRECT according to the wireless connection request.

If the wireless communication unit 430 is connected to the image forming device by means of the WIFI DIRECT, the control unit 450 controls the wireless communication unit 430 to transmit a warming-up command of elements associated with a printing operation. In other words, if the wireless communication unit 430 is connected to the image forming device by means of the WIFI DIRECT, the control unit 450 may control the wireless communication unit 430 to transmit the warming-up command to the image forming device by determining that there is a possibility that the image forming device will be used.

The warming-up command is transmitted to the image forming device through the wireless communication unit 430 in the above description but is not limited thereto. If a communication state of the wireless communication unit 430 is not smooth or the wireless communication unit 430 transmits and receives a signal or data, the control unit 450 may control the speaker 440 to output a sound corresponding to the warming-up command.

If a printing job command of preset data is input, the control unit 450 converts this data into printing data. Also, the control unit 450 controls the wireless communication unit 430 to transmit the printing job command along with the printing data to the image forming device.

If error information of the image forming device is extracted from the sound recorded by the microphone 410, the control unit 450 controls the display unit 460 to display the error information of the image forming device. Also, if device state information associated with an operation of the image forming device, consumable state information associated with a consumable unit installed in the image forming device, etc. are extracted besides this, the control unit 450 may control the display unit 460 to display pieces of the extracted information.

If information on an URL is extracted from the sound recorded by the microphone 410 or information on an URL is received through the wireless communication unit 430, the control unit 450 may download various types of information by accessing a communication network through an additional communication or accessing a corresponding URL through an Internet communication network. For example, fax data received by the image forming device, scan data generated by the image forming device, or the like may be downloaded from an URL.

If any information is extracted from the sound recorded by the microphone 410 or information is received through the wireless communication unit 430, the control unit 450 may display the information through the display unit 460 and simultaneously notify a user that each piece of information is received, by using vibrations, a sound, or the like.

If the user changes a setting value of the image forming device such as a printing option on the electronic device 400, the electronic device 400 may control the speaker 440 to output a sound corresponding to a device setting value. Therefore, the device setting value of the image forming device may be updated through the sound. Also, besides this, if URL information for printing, e-mail information for scan-to-e-mail, or various types of image forming jobs are completed in the image forming device, a contact number or the like that may be used when notifying the user of it may be transmitted.

As described above, the electronic device 400 may be connected to an image forming device by means of WIFI DIRECT by transmitting and receiving connection information by using a sound. Also, if a communication state of the wireless communication unit 430 is not smooth or a large amount of signal or data is transmitted and received to the wireless communication unit 430, another communication path may be provided.

Figure 6A:
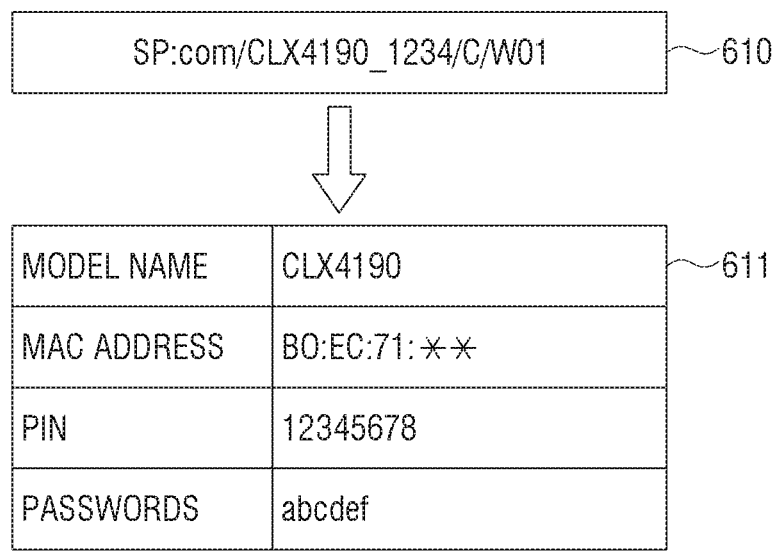
FIGS. 6A through 6C illustrate information on an URL according to a sound, according to various exemplary embodiments.
Figure 6B:
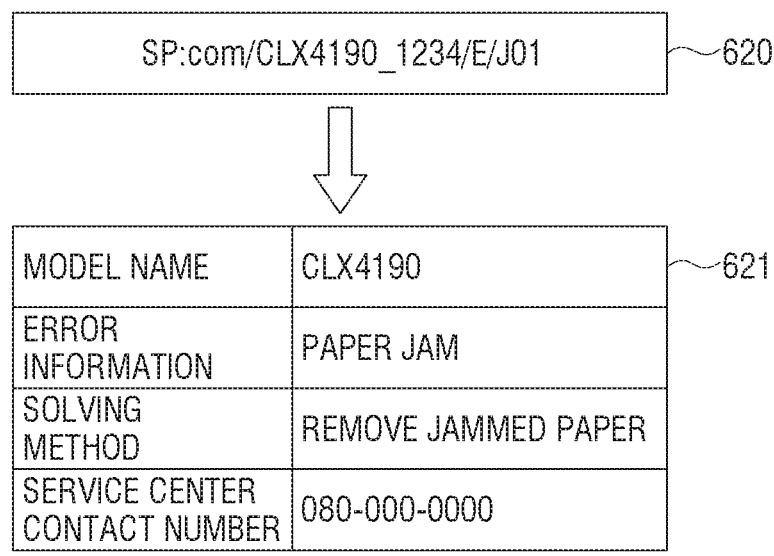
Figure 6C:
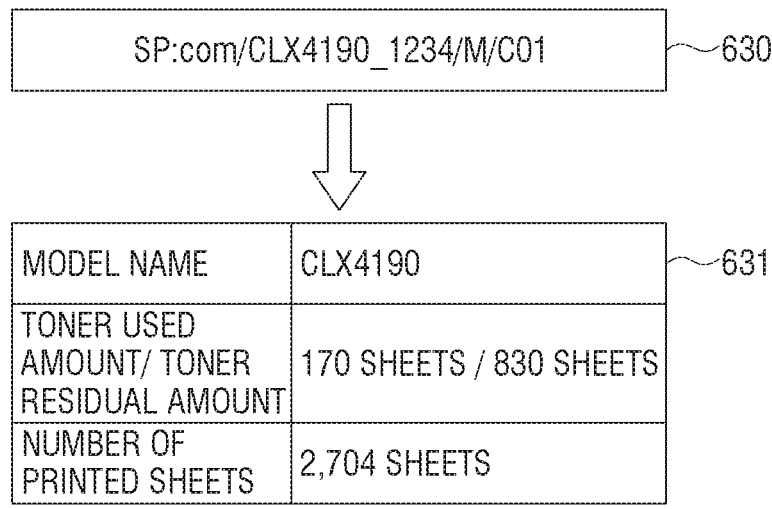

FIGS. 6A through 6C illustrate information on an URL according to various exemplary embodiments of the present invention. FIG. 6A illustrates information on an URL corresponding to connection information of an image forming device.

Referring to FIG. 6A, first information on an URL 610 is an URL address that stores device information, an MAC address, a PIN number, and passwords. Therefore, an electronic device may access this URL address and acquire connection information 611 from a page corresponding to this URL address.

The connection information 611 may include an MAC address, a PIN number, passwords, etc. necessary for connection of the image forming device. The electronic device may extract the first information on an URL 610 from a sound, download the connection information 611 by accessing the URL address, and request a wireless connection from the image forming device by using the connection information 611.

FIG. 6B illustrates error information generated when performing a job.

Referring to FIG. 6B, second information on an URL 620 is an URL address including information (model name) about a device where an error occurs, error contents, a solving method, and a service center contact number. Therefore, the electronic device may access the URL address and acquire the error information 620 from a page corresponding to the URL address.

The error information 620 may include device information (model name) associated with an error, error contents, a solving method, a service center contact number, etc. The electronic device may extract second information on an URL 620 from the sound and download error information 621 by accessing the URL address. Also, the error information 621 may be displayed on a screen so as to enable a user to check the error information 621. Therefore, the user may know what type of error occurs from which device and know an error solving method. Also, if an error is not solved, the user may make a phone call to a service center contact number to request A/S.

FIG. 6C illustrates state information of a consumable unit.

Referring to FIG. 6C, third information on an URL 630 is a URL address including device information, a toner used amount (or a toner residual amount), and an accumulated printing amount. Therefore, the electronic device may access this URL address and download consumable state information 631 from a page corresponding to this URL address.

The consumable state information 631 may include device information, a toner used amount (or a toner residual amount), accumulated printing amount, etc. However, the consumable state information 631 is not limited thereto and may further include consumable information about a drum unit, a transfer unit, or the like.

The electronic device may download the consumable state information 631 from a URL address and display the consumable state information 631 on a screen so as to enable the user to check the consumable state information 631. Therefore, the user may replace consumables at an appropriate time by checking states of the consumables of the image forming device.

The image forming device may output sounds respectively corresponding to the connection information 611, the error information 621, and the consumable state information 631. However, if information is transmitted by a sound, information having a short length may be transmitted when considering that an information transmission speed is slow and affected by noise. Therefore, the image forming device may output sounds respectively corresponding to the first through third information on an URL 610, 620, and 630 illustrated in FIGS. 6A through 6C.

FIG. 7 is a flowchart of a wireless connection method of an image forming device according to an exemplary embodiment of the present invention. Referring to FIG. 7, if a preset condition is satisfied in operation S710, the image forming device outputs a sound corresponding to connection information necessary for connection to the image forming device in operation S720. Here, the preset condition may be one of a case where power of the image forming device is changed from an off state into an on state, a case where a user command of an output of connection information is input, and a case where a period associated with the output of the connection information elapses.

If a wireless connection request is received from an electronic device in operation S730 after the sound is output, the image forming device is connected to the electronic device, which transmits the wireless connection request, by means of WIFI DIRECT in operation S740.

Figure 8:
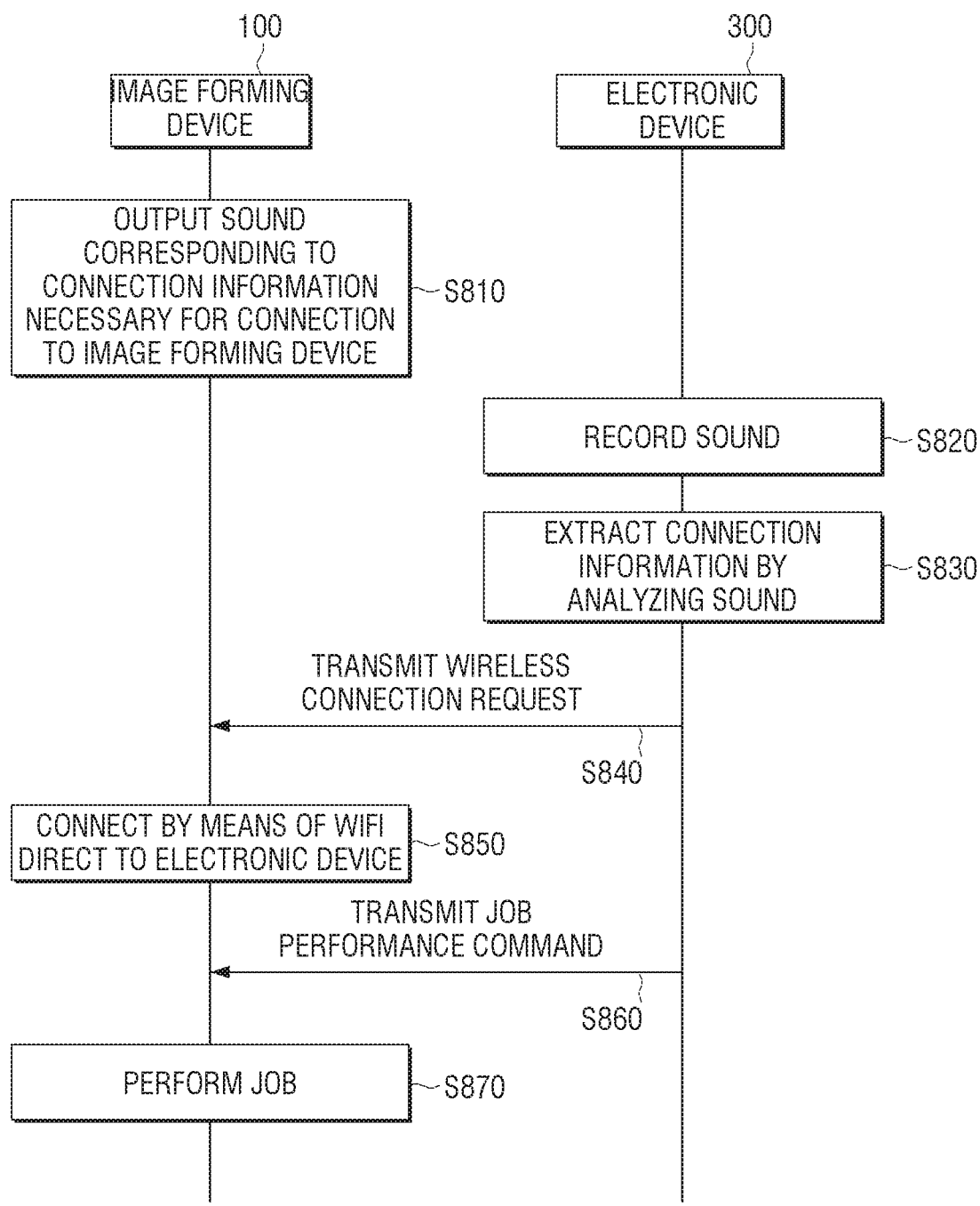
FIG. 8 is a timing diagram illustrating a wireless connection method of an image forming system according to an exemplary embodiment of the present invention.

FIG. 8 is a timing diagram illustrating a wireless connection method of an image forming system according to an exemplary embodiment of the present invention.

In operation S810, an image forming device 100 outputs a sound corresponding to connection information necessary for connection to the image forming device. In operation S820, an electronic device 300 records the sound output from the image forming device 100. In operation S830, the electronic device 300 extracts connection information of the image forming device 100 by analyzing the recorded sound.

If the electronic device 300 transmits a wireless connection request including the extracted connection information to the image forming device 100 in operation S840, the image forming device 100 is connected to the electronic device 300 by means of WIFI DIRECT according to the wireless connection request in operation S850.

Here, the wireless connection request transmitted from the electronic device 300 may include the connection information. Therefore, the image forming device 100 may compare the connection information included in the wireless connection request with connection information thereof, if two pieces of the connection information correspond to each other, perform a WIFI DIRECT connection, and if the two pieces of the connection information do not correspond to each other, reject the WIFI DIRECT connection. Therefore, the image forming device 100 and the electronic device 300 may transmit and receive data by means of WIFI DIRECT.

If the electronic device 300 transmits a job performance command of printing data to the image forming device 100 in operation S860, the image forming device 100 performs a printing job of the printing data in operation S870.

Although the image forming device 100 or the electronic device 300 does not include an NFC module as described above, the image forming device 100 or the electronic device 300 may transmit and receive connection information by using a sound to perform a WIFI DIRECT connection. Therefore, the electronic device 300 may form a wireless connection link with the image forming device to control various types of job performances of the image forming device 100.

A wireless connection method as described above may be realized as a program (or an application) including a computer executable algorithm. Also, the program may be stored on a non-transitory computer readable medium to be provided.

Hereinafter, an exemplary embodiment of the present invention will be described in more detail with reference to the attached drawings. However, in the description of the present invention, detailed descriptions of associated well-known functions or elements may be omitted when they are determined as unnecessarily making the essentials of the present invention obscure.

Figure 9:
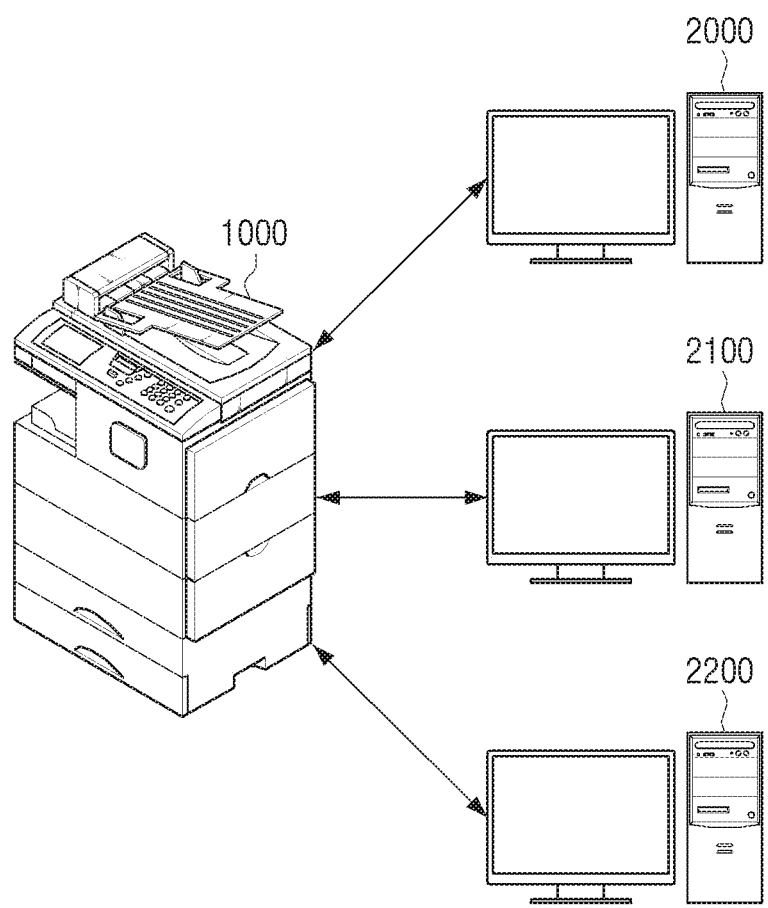
FIGS. 9 and 10 illustrate image forming devices according to various exemplary embodiments of the present invention.

FIG. 9 illustrates an image forming system according to an exemplary embodiment of the present invention. Referring to FIG. 9, the image forming system includes an image forming device 1000 and a plurality of host devices 2000, 2100, 2200, . . . .

The image forming device 1000 may be a printer, a copier, a scanner, a fax machine, a Multi Function Peripheral (MFP) that complexly realizes functions thereof through one device, or the like. The image forming device 1000 may be connected to the plurality of host devices 2000, 2100, 2200 by wired or wireless to perform a printing job, etc.

The plurality of host devices 2000, 2100, 2200 may be desktop computers, notebook computers including display units, portable phones, smartphones, tablet PCs, mobile devices, or the like. Printer drivers for generating printing data may be installed in the plurality of host devices 2000, 2100, 2200, and the plurality of host devices 2000, 2100, 2200 may transmit the printing data to the image forming device 1000 so as to perform a printing job corresponding to the printing data.

A printer driver is software that enables the host device 2000 (hereinafter, the host device 2000 will be described as being representative of a plurality of host devices.) to communicate with the image forming device 1000 and is to convert a printing command into a language understandable by the image forming device, instruct the image forming device 1000 what to do for a command, and manage a job that is being performed by the image forming device 1000.

Therefore, in order to enable a user to print data stored in the host device 2000 or documents displayed on a screen of the host device 2000 by using the image forming device 1000, a printer driver may be installed in the host device 2000.

The printer driver may vary according to manufacturers and image forming devices. If a printer driver manufactured by a different manufacturer from a manufacturer of the image forming device 1000 is installed in the host device 2000, printing data may not be output or may be abnormally output. According to an exemplary embodiment of the present invention, the image forming device 1000 may receive printing data from the host device 2000 to detect printer driver information of the host device 2000 and determine whether the detected printer driver information is appropriate for the image forming device 1000.

In the present exemplary embodiment, "appropriate" means that a printer driver installed in the host device 2000 is manufactured by the same manufacturer as a manufacturer of the image forming device 1000 or is manufactured by the same manufacturer as the manufacturer of the image forming device 1000 and is a driver of the same type of device as the image forming device 1000.

If the printer driver information is inappropriate for the image forming device 1000, the image forming device 1000 may provide an installation file of a printer driver of the image forming device 1000 to the host device 2000 or may provide a link address where the installation file of the printer driver is stored.

However, the present invention is not limited thereto, and the image forming device 1000 may provide an installation file of a printer driver or a link address, where the installation file is stored, to an address corresponding to information of the host device 2000 detected from printing data. Here, the address may be an e-mail address or a server address. In detail, the address may be an e-mail address of a user of the host device 2000 or an address of a server that stores a shared folder of the user of the host device 2000.

The user of the host device 2000 may install a printer driver of the image forming device 1000 in the host device 2000 by using a driver installation file (or a link address where an installation file is stored) received from the image forming device 1000.

The image forming device 1000 may be a device that does not have a function such as an e-mail transmission function. An exemplary embodiment of this case will now be described with reference to FIG. 10.

Figure 10:
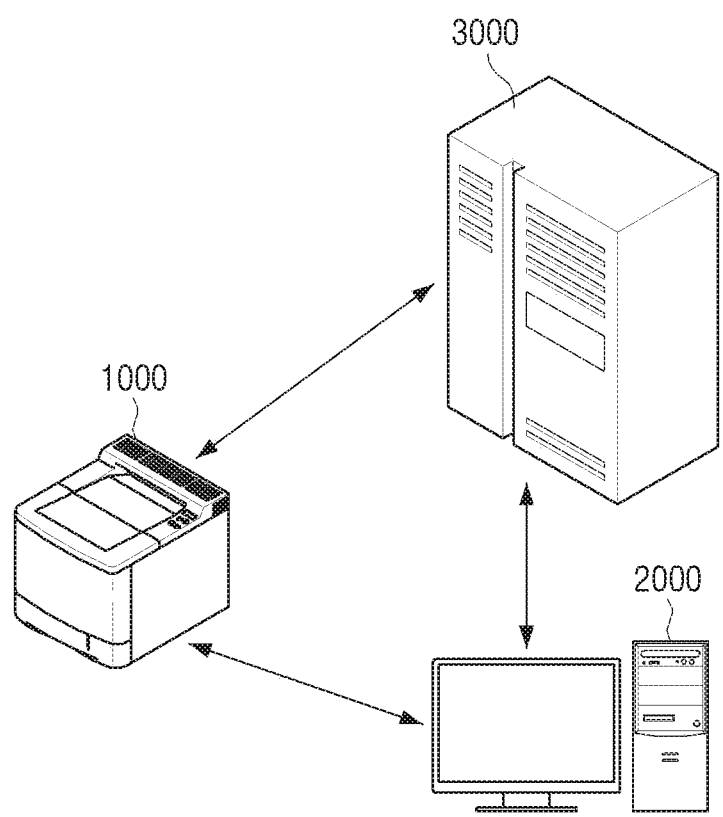

FIG. 10 illustrates an image forming system according to another exemplary embodiment of the present invention. Referring to FIG. 10, the image forming system may include an image forming device 1000, a host device 2000, and an external server 3000.

The external server 3000 may be a server that synthetically manages the plurality of host devices 2000, 2100, and 2200. Also, a printer driver installation file of the image forming device 1000 may be stored in the external server 3000. If a plurality of image forming devices are in an enterprise environment, printer driver installation files of the plurality of image forming devices may be stored in the external server 3000.

The image forming device 1000 may receive printing data from the host device 2000 and detect printer driver information and characteristic information of the host device from the received printing data. If the printer driver information is inappropriate for the image forming device 1000, the image forming device 1000 may transmit a control command to the external server 3000 so as transmit an installation file of a printer driver corresponding to the image forming device 1000 or a link address, where the installation file is stored, to the hose device 2000.

Alternatively, if the image forming device 1000 transmits characteristic information of a host device using an inappropriate printer driver to the external server 3000, the external server 3000 may transmit a printer driver of the image forming device 1000 or a link address, where the printer driver is stored, to an address corresponding to the characteristic information of the host device 2000.

According to an exemplary embodiment as described above, although the image forming device 1000 does not have a function such as an e-mail transmission or the like, a printer driver installation file of the image forming device 1000 may be provided to a user of the host device 2000 by using the external server 3000.

Figure 11:
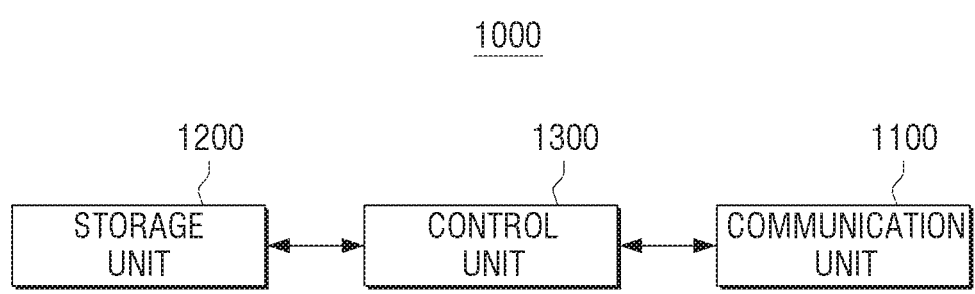
FIG. 11 is a block diagram of an image forming device according to an exemplary embodiment of the present invention.

FIG. 11 is a block diagram of an image forming device 1000 according to an exemplary embodiment of the present invention.

Referring to FIG. 11, the image forming device 1000 may include a communication unit 1100, a storage unit 1200, and a control unit 1300.

The communication unit 1100 may be an element for communicating with the host device 2000 or the external device 3000, in detail, may receive printing data from the host device 2000 or may provide a driver installation file of the image forming device 1000 or a link address, where the installation file is stored, to an address corresponding to characteristic information of the host device 2000.

The communication unit 1100 may transmit a control command to the external server 3000 to communicate with the external server 3000 so as to provide a driver installation file to the host device 2000 and transmit a driver installation file downloaded from the external server 3000 to the host device 2000.

The communication unit 1100 may communicate with various types of external devices according to various types of communication methods, for example, may include various types of communication chips such as a WIFI chip, a BLUETOOTH chip, an NFC chip, a wireless communication chip, etc. Here, the WIFI chip, the BLUETOOTH chip, and the NFC chip respectively perform communications according to a WIFI method, a BLUETOOTH method, and an NFC method. Among these, the NFC chip refers to a chip that operates according to a Near Field Communication (NFC) method using a band of 13.56 MHz among various types of RF-ID frequency bands such as 135 kHz, 13.56 MHz, 433 MHz, 860~960 MHz, 2.45 GHz, etc. If the WIFI chip or the BLUETOOTH chip is used, various types of connection information such as an SSID, a session key, etc. may be transmitted and received to connect communications by using the various types of connection information and then transmit and receive various types of information. The wireless communication chip refers to a chip that performs communications according to various types of communication standards such as IEEE, ZIGBEE, $3^{rd}$ Generation (3G), $3^{rd}$ Generation Partnership Project (3GPP), Long term Evolution (LTE), etc.

The storage unit 1200 may store various types of programs or data associated with an operation of the image forming device 1000, setting information set by the user, system operating software, various types of application programs, information about an operation corresponding to user manipulation contents, etc.

In detail, the storage unit 1200 may store a printer driver installation file of the image forming device 1000 and a configuration file for installing a driver.

Here, the configuration file may be generated based on attribute information (IP address, printing basic setting) of the image forming device 1000 and may be added and provided to the printer driver installation file. Therefore, the user may be provided with the printer driver installation file to which the configuration file is added and easily install a printer driver in the host device 2000 although complicated printing settings are not input one by one.

The configuration file may be automatically generated based on the attribute information of the image forming device 1000 or may be manually generated by directly applying a setting value by a manager.

Also, the storage unit 1200 may store a link address where a printer driver installation file of the image forming device 1000 is stored, a product introduction manual of the image forming device 1000, a driver installation manual, other additional programs or a link address where the other additional programs are stored, etc. The link address may be a web address, a QR code connected to the web address, or the like.

Here, the other additional programs refer to a mobile application connectable to the image forming device 100, an agent program for automatically updating a printer driver, a sub program, etc.

Also, the storage unit 1200 may store a template or the like configuring a UI screen displayed on the image forming device 1000. The UI screen will be described in detail with reference to FIG. 13.

The control unit 1300 is an element capable of controlling an overall operation of the image forming device 1000.

In particular, the control unit 1300 may detect printer driver information and characteristic information of the host device 2000 from printing data received from the host device 2000.

A detailed configuration of the printing data will be described. A Header of the printing data includes information such as Printer Job Language (PJL), Document Structuring Conventions (DSC), etc. The PJL and the DSC are customized and defined according to manufacturers.

The control unit 1300 may detect printer driver information of a host device generating printing data and characteristic information of the host device from the Header of the printing data. FIG. 12 illustrates examples of PJL and DSC.

Referring to FIG. 12, the PJL or the DSC may include Host Name information that is characteristic information of the host device 2000, manufacturer information of a printer driver, or a PC name of the host device 2000. The characteristic information of the host device 2000 refers to information included in the Header of the printing data as described above, for example, refers to a Host Name, a User Name, an IP address, or the like of the host device 2000.

The control unit 1300 may compare the characteristic information of the image forming device 1000 stored in the storage unit 1200 with the information included in the printing data described above to determine whether a printer driver of a host device is appropriate for the image forming device 1000. In detail, the control unit 1300 may determine whether a Driver manufacturer included in the Header is the same as a manufacturer of the image forming device 1000.

However, the present invention is not limited thereto, and the control unit 1300 may determine whether the driver is the same as the image forming device 100, besides whether the driver manufacturer is the same as the manufacturer of the image forming device 100. In other words, if the driver manufacturer is the same as the manufacturer of the image forming device 1000 but is a driver of another product, the control unit 1300 may determine that the driver is inappropriate.

The control unit 1300 may acquire an address corresponding to characteristic information of the host device 2000 by accessing e-mail addresses of users of the external server 3000 or the host device 2000 or another server managing a server address. Here, the address is an address having an attribute for notifying the user or contacting the user. In this case, the another server may be an Active Directory (AD) server of an enterprise.

The Active Directory (AD) server of the enterprise may manage contact numbers such as e-mail addresses of employees (users of the host device), and may match, store, and manage at least one of an e-mail address of a user and a server address with a user name.

The storage unit 1200 of the image forming device 1000 may store an address that is contactable with the user. In this case, the control unit 1300 may acquire an address, to which a driver installation file or the like is to be transmitted, from the storage unit 1200 without passing through an additional server.

If printer driver information extracted from printing data is inappropriate for the image forming device 1000, the control unit 1300 may provide an installation file of a printer driver corresponding to the image forming device or a link address, where the installation file is stored, to the address acquired as described above.

Also, the control unit 1300 may generate a configuration file based on attribute information (IP address, printing basic setting, network port information) of the image forming device 1000 or information provided by a manager and provide the configuration file along with the printer driver installation file.

In an environment where several types of image forming devices are installed, different printer drivers are installed according to devices, and IP addresses of the image forming devices are different from one another. Therefore, if a configuration file is provided together as in an exemplary embodiment of the present invention, efforts of the user to search for and install an appropriate printer driver of the image forming device 1000 and input an IP address, a printing attribute, etc. of the image forming device 1000 one by one may be reduced.

The configuration file may be generated according to settings that are directly input by the manager. For example, the manager may set printing basic settings such as black and white printing, double-sided printing basics, etc. according to a resource saving policy of an enterprise, and the control unit 130 may generate a configuration file according to settings of the manager. The configuration file may be provided along with a printer driver installation file so as to enable the user to easily install a printer driver.

Also, the control unit 1300 may generate a list of host devices where a printer driver inappropriate for the image forming device 1000 is installed and provide the list to the manager at preset periods. For example, the list may be transmitted to an e-mail address of the manager.

In detail, the list may include a name of a host device where a printer driver of the image forming device 1000 is not installed, an IP address, etc. The manager may check the list to transmit a message for requesting installation to a user who does not install the printer driver of the image forming device 1000 or may directly visit the user to install the driver.

Also, the control unit 1300 may provide a use manual of the image forming device 1000, a main function manual of the image forming device 1000, and other additional programs along with the printer driver installation file.

The printer driver installation file of the image forming device 1000 or various types of information may be stored in the external server 3000 and may be provided from the external server 3000 to the user. Therefore, a space of the storage unit 1200 of the image forming device 1000 may be efficiently used, and even if an e-mail transmission function or the like is not supported in the image forming device 1000, and the image forming device 1000 extracts information from the printing data and transmits the information to the external server 3000, the external server 3000 may replace a role of the image forming device 1000 described above.

In other words, according to an exemplary embodiment of the present invention, the external server 3000 may perform all of functions of the control unit 1300 described above. For example, the external server 3000 may perform a configuration file generating function and an e-mail address acquiring function, and the same things as those stored in the storage unit 1200 of the image forming device 1000 may be stored in the external server 3000.

Figure 13:
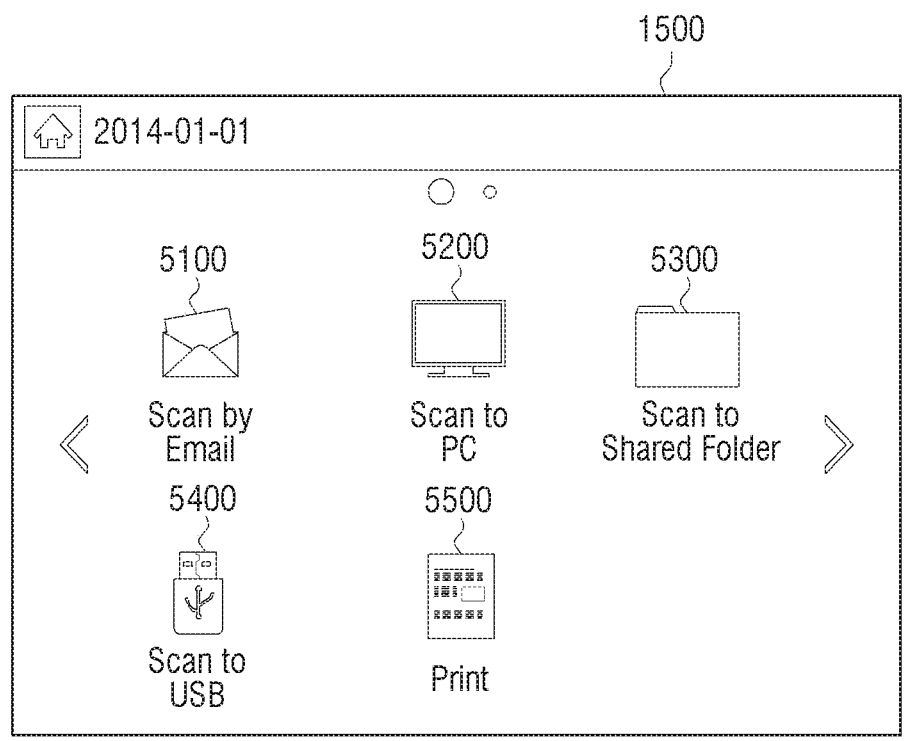
FIG. 13 illustrates a UI screen provided by an image forming device, according to an exemplary embodiment of the present invention.

FIG. 13 illustrates a UI screen displayed by the image forming device 1000, according to an exemplary embodiment of the present invention.

According to another exemplary embodiment of the present invention, if a driver installed in the host device 2000 is manufactured by a different manufacturer from a manufacturer of the image forming device or is different from a driver installed in the image forming device 1000, the control unit 1300 may provide a UI screen so as to enable a user to select a providing method instead of immediately providing a printer driver of the image forming device.

After transmitting printing data to the image forming device 1000, the user may come to find a printed matter. In this case, if a printer driver installed in the host device 2000 is not appropriate according to a printing data analysis result, the control unit 1300 may display a UI screen as illustrated in FIG. 13 through a display unit 1500 of the image forming device 1000.

The display unit 1500 is an element that displays various types of menus provided by the image forming device 1000 and may be realized as a touch screen with which an input unit is combined. Alternatively, an input unit (not shown) may be installed in the image forming device 1000 separately from the display unit 1500.

If the display unit 1500 is realized as the touch screen, the user may select a method of providing information for installing a printer driver of the image forming device 1000 through the UI screen. For example, the UI screen may include a menu 5100 for providing by e-mail, a menu 5200 for direct providing through a storage unit of a host device, a menu 5300 for providing through a shared folder of the user installed in a server, a menu 5400 for providing through a mobile storage medium, a menu 5500 for providing through an output printed matter, etc.

If the menu 5100 for a transmission by an e-mail is selected on the UI screen, the control unit 1300 may transmit a link address, where a printer driver installation file of the image forming device 1000 is stored, to an e-mail address corresponding to characteristic information of the host device 2000.

If the PC transmission menu 5200 for a transmission to the storage unit of the host device is selected on the UI screen, the control unit 1300 may transmit the printer driver installation file of the image forming device 1000 to a server address corresponding to characteristic information of the host device 2000.

If the shared folder menu 5300 for a transmission to a shared folder of a user of the host device is selected on the UI screen, the control unit 1300 may transmit the printer driver installation file of the image forming device 1000 to a shared folder corresponding to the characteristic information of the host device 2000.

If the USB menu 5400 is selected on the UI screen, the control unit 1300 may transmit the printer driver installation file of the image forming device 1000 to a USB inserted into a USB input port of the image forming device 1000.

If the manual output menu 5500 is selected on the UI screen, the control unit 1300 may output a manual for installing a printer driver of the image forming device 1000 through an output unit (not shown). In this case, the manual may include a printer drier installation method, a link address where an installation file is stored, a QR code connectable to this, or the like. The manual will be described in more detail later with reference to FIG. 15.

If a preset event occurs, the control unit 1300 may display the UI screen described above on the display unit 1500. The event may include an event of initially performing a user authentication of a particular user. In other words, if a particular user initially tags an ID card of the particular user onto an authentication unit 1400 to use the image forming device 1000 after installing the image forming device 1000, the control unit 1300 may display the UI screen described above for an installation recommendation of the printer driver of the image forming device 1000.

Figure 14:
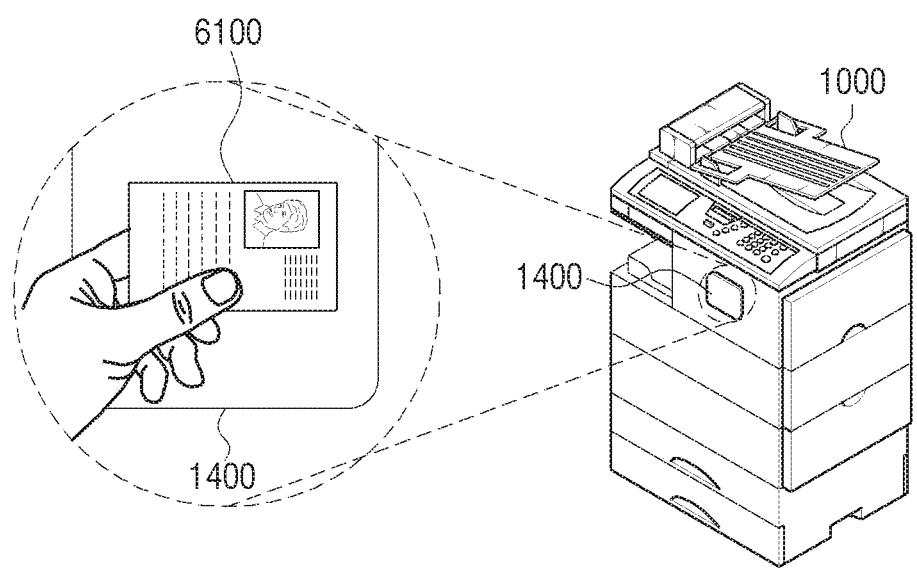
FIG. 14 illustrates a user authentication of an image forming device, according to an exemplary embodiment of the present invention.

In relation to this, referring to FIG. 14, the authentication unit 1400 for authenticating a user may be provided in the image forming device 1000. In detail, the authentication unit 1400 may perform a user authentication according to a method of tagging an ID card 6100. The present invention is not limited thereto, and the user authentication may be performed according to various methods such as an ID and password input, a fingerprint recognition, a voice recognition, etc.

Alternatively, even if an event where the host device 2000 is initially recognized in the image forming device occurs, the control unit 1300 may display the UI screen as described above. In other words, this corresponds to a case where printing data is first received from the particular host device 2000.

Alternatively, even if printing data is received within a preset period or an event where a user authentication is performed occurs after an initial operation of the image forming device 1000, the control unit 1300 may display a UI on a screen as described above. After installing the image forming device 1000, the manager may set the UI screen to be displayed if an event as described above occurs for a particular period, in order to support an installation of the printer driver of the image forming device 1000.

According to another exemplary embodiment of the present invention, if printer driver information included in the received printing data is inappropriate for the image forming device 1000, the control unit 1300 may output a driver installation manual of the image forming device along with the printing data through an output unit.

Figure 15:
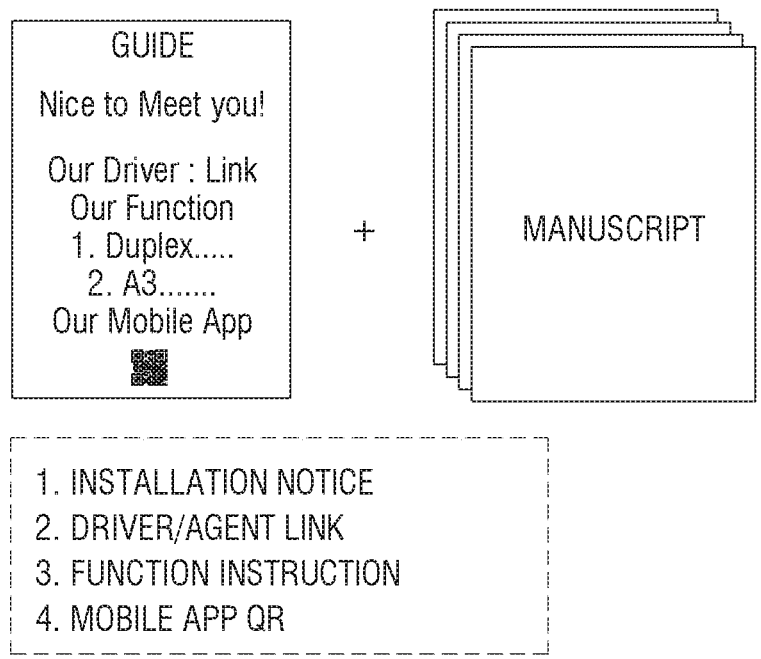
FIG. 15 illustrates a printer driver installation manual output from an image forming device, according to an exemplary embodiment of the present invention.

Since there is a case where printing is possible through a printer driver of another company, this is to generate a printed matter if printing is possible as described above, i.e., to provide a notice sentence so as to install a printer driver of a company of the image forming device. Referring to FIG. 15, a manual output as described above may include an installation manual, a driver/Agent link, a function introduction of the image forming device 1000, a Mobile App QR code, etc.

Figure 16:
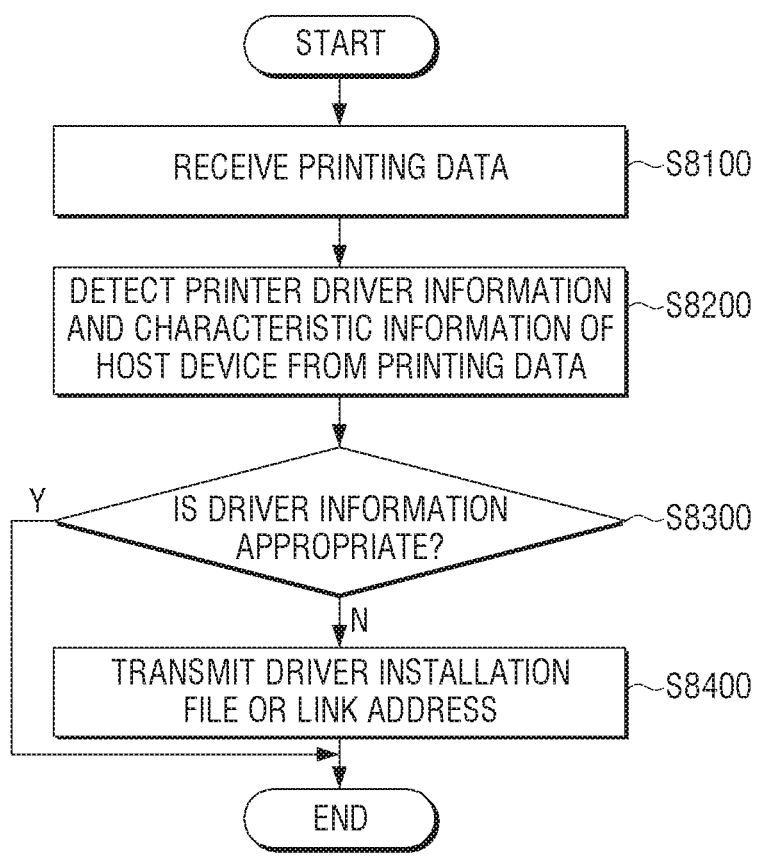
FIGS. 16 and 17 illustrate methods of providing a printer driver of an image forming device, according to various exemplary embodiments of the present invention.

FIG. 16 is a flowchart of a method of providing a printer driver of an image forming device, according to an exemplary embodiment of the present invention.

Referring to FIG. 16, in operation S8100, printing data is received from the host device 2000 through the communication unit 1100 of the image forming device 1000. In operation S8200, the control unit 1300 detects printer driver information and characteristic information of the host device from the printing data.

In operation S8300, the control unit 1300 determines whether the detected printer driver information of the host device is appropriate for the image forming device 1000. If it is determined that the printer driver information of the host device is appropriate for the image forming device 1000, a printing job is performed. If it is determined that the printer driver information of the host device is inappropriate for the image forming device 1000, an installation file of a printer driver corresponding to the image forming device 1000 or a link address where the installation file is stored is provided to an address corresponding to the characteristic information of the host device 2000 in operation S8400.

In this case, information associated with other printer driver installations may be additionally provided to an address. For example, a link address where a printer driver installation file of the image forming device 100 is stored, a product introduction manual of the image forming device 1000, a driver installation manual, other additional programs or a link address where the other additional programs are stored, etc. may be provided. The link address may be a web address, a QR code connected to the web address, or the like.

Here, the other additional programs refer to a mobile application connectable to the image forming device 1000, an Agent Program for automatically updating a printer driver, a sub program, etc.

Various exemplary embodiments described through FIGS. 9 through 15 may be added to a method of providing a printer driver of an image forming device described in FIG. 16 as they are or may be modified and added within a range that may be obviously changed by those skilled in the art. Therefore, repeated descriptions of various exemplary embodiments of a method of providing a printer driver of an image forming device that may be deduced will be omitted within a range overlapping with the above-described contents.

Figure 17:
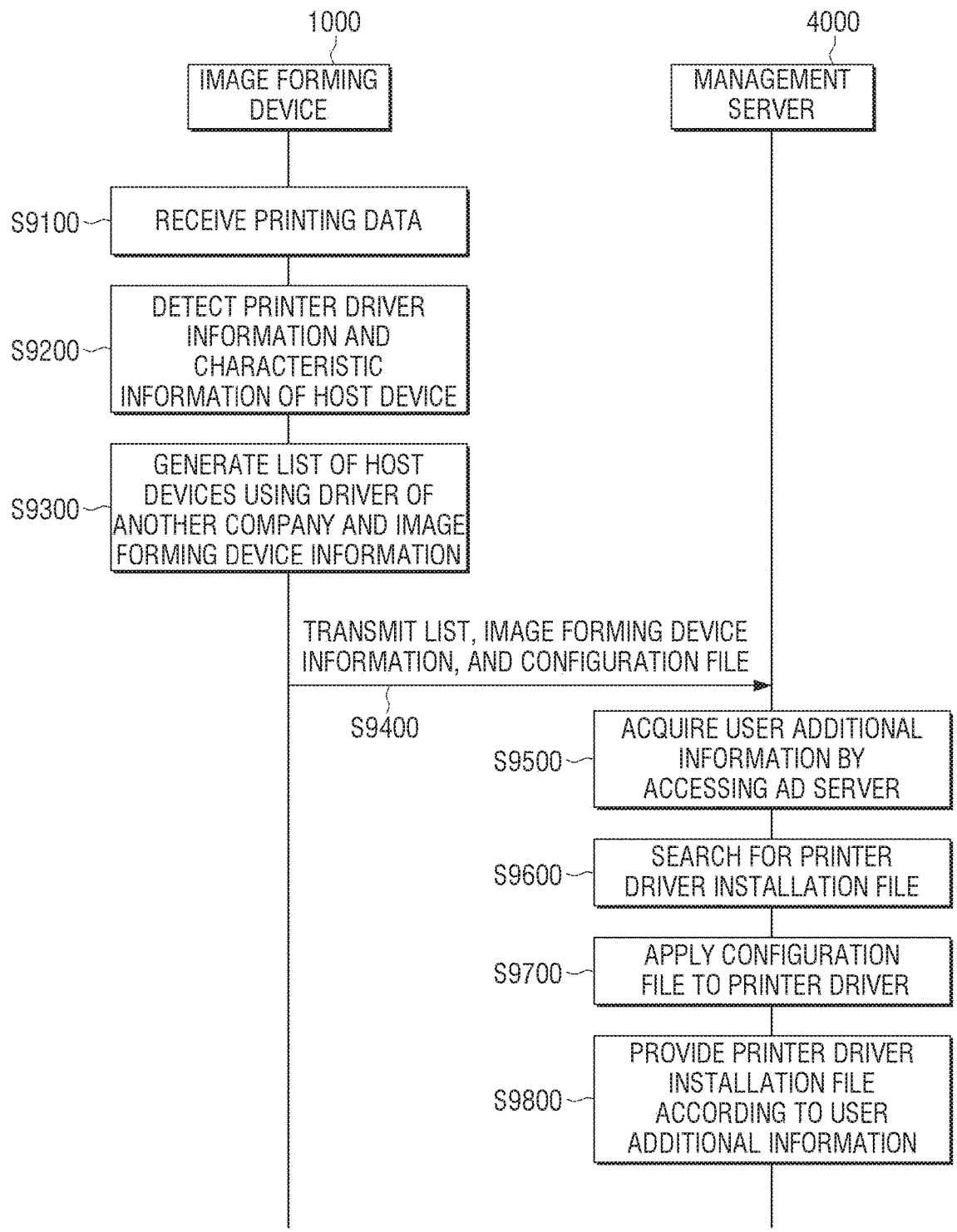

FIG. 17 is a flowchart of a method of providing a printer driver of an image forming device, according to another exemplary embodiment of the present invention.

In operation S9100, the image forming device 1000 receives printing data from the host device 2000 through the communication unit 1100. In operation S9200, the control unit 1300 detects printer driver information and characteristic information of the host device from the printing data. In detail, an IP address of the host device and manufacturer information of a printer driver generating the printing data may be detected.

In operation S9300, the control unit 1300 generates a list of host devices using a printer driver of a different manufacturer from the image forming device 1000 and information (e.g., a model name, a Serial Number, etc.) of the image forming device 1000.

Also, the control unit 1300 may generate a configuration file by using an IP address and a printing basic setting value set in the image forming device 1000 and store the configuration file in the storage unit 1200.

In operation S9400, the control unit 1300 transmits a list, information of the image forming device 1000, and the configuration file to a management server 4000 through the communication unit 1100. However, the present invention is not limited thereto, and a configuration file of each image forming device may be stored in the management server 4000. In this case, the image forming device 1000 may generate the configuration file or may not transmit the configuration file to the management server 4000. The management server 4000 may be a Fleet Management Server.

In operation S9500, the management server 4000 accesses a server (an AD server of an enterprise) managing e-mail addresses, etc. of users and acquires user additional information based on the list. The user additional information includes a user e-mail address or a server address to which the printer driver of the image forming device 1000 will be transmitted, or the like. If the management server 4000 is a server managing the e-mail addresses of the users, an operation of accessing an additional server may be omitted.

A manager pre-stores a printer driver installation file of each image forming device in the management server 4000. The management server 4000 searches for the printer driver installation file of the image forming device 1000 based on the information of the image forming device 1000 received from the image forming device 1000 in operation S9600 and applies the configuration file to the searched installation file in operation S9700.

In operation S9800, the management server 4000 transmits the printer driver installation file of the image forming device 1000 and a link address, where the installation file is stored, to a user using a printer driver of another company product, by using the user additional information acquired in operation S9600.

In this case, information associated with other printer driver installations may also be provided along with the printer driver installation file or the link address where the installation file is stored. For example, the link address where the printer driver installation file of the image forming device 1000 is stored, a product introduction manual of the image forming device 1000, a driver installation manual, other additional programs or a link address where the other additional programs are stored, etc. may be provided. The link address may be a web address, a QR code connected to the web address, or the like.

Here, the other additional programs refer to a mobile application connectable to the image forming device 1000, an Agent Program for automatically updating a printer driver, a sub program, etc. The Agent Program refers to a program for managing updating of the printer driver.

The management server 4000 may communicate with a plurality of image forming devices to perform the above-described operations.

According to the above-described various exemplary embodiments, in a preset-scale or more enterprise environment where an image forming device of another company is installed, when the image forming device of the another company is replaced with an image forming device of a company, the image forming device may be automated to save efforts of a manager to install a printer driver, and a printing error occurring due to using of a driver of another company may be minimized. Also, even in a small-scale enterprise environment, even when a new image forming device is installed, this may be easily notified to users without an additional notice.

Also, according to the above-described various exemplary embodiments, a necessity for a new printer driver installation may be notified to users through a printed manual, a UI screen, or the like. Therefore, a manufacturer may naturally induce an installation of a printer driver of a company of the manufacturer. Also, although a user does not perform an additional setting, the user may easily install a new printer driver through a provided configuration file.

A method of providing a printer driver of an image forming device according to the above-described various exemplary embodiments may be stored on a non-transitory readable medium. The non-transitory readable medium may be loaded and used on various types of devices.

The non-transitory readable medium is a medium which does not store data temporarily such as a register, cash, and memory but stores data semi-permanently and is readable by devices. More specifically, the non-transitory readable medium may be a CD, a DVD, a hard disk, a BLU-RAY DISK, a USB, a memory card, an ROM, or the like.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

The invention claimed is:

1. An image forming device connectable to an electronic device, the image forming device comprising:
    a speaker;
    a storage unit to store connection information for wireless connection to the electronic device;
    a processor to:
        in case of a preset condition, control the speaker to output a sound corresponding to the connection information in a preset frequency band supported by the speaker, and
        in case of an error of an image forming job occurring in the image forming device, control the speaker to output a sound corresponding to the error of the image forming job in a preset frequency band supported by the speaker;
    a communication unit to, in response to a wireless connection request with respect to the connection information being received from the electronic device receiving the sound, form a wireless connection with the electronic device which transmits the wireless connection request; and
    a printing unit to print data received through the formed wireless connection,
    wherein the connection information includes address information on a uniform resource locator (URL) comprising a Media Access Control (MAC) address of the image forming device, a Personal Identification Number (PIN), and a password set by a user.

2. The image forming device of claim 1, wherein if at least one of power of the image forming device is turned on, a user command of an output of the connection information is input, or a period associated with the output of the connection information elapses, the processor controls the speaker to output the sound corresponding to the connection information.

3. The image forming device of claim 1, wherein if the wireless connection request is not received for a preset time after initially outputting the sound corresponding to the connection information through the speaker, the processor controls the speaker to output the sound corresponding to the connection information by increasing a volume level of the sound corresponding to the connection information.

4. The image forming device of claim 1,
    wherein the storage unit stores contact information of a plurality of users, and
    wherein the image forming device further comprises a fax unit to receive fax data and notify the receiving of the fax data to an electronic device corresponding to sending information of the received fax data based on the contact information.

5. The image forming device of claim 4, wherein the processor controls the wireless communication unit to transmit the fax data received through the fax unit to a preset URL and controls the fax unit to notify information on the URL storing the fax data to an electronic device corresponding to sending information of the received fax data.

6. The image forming device of claim 1, further comprising:

a scanning unit to generate scan data by scanning a document,
wherein in response to the scan data being generated by a scan job of the scanning unit, the processor controls the speaker to output a sound indicating that the scan job is completed.

7. The image forming device of claim 1, further comprising:
a microphone to record a sound,
wherein the processor analyzes the sound recorded through the microphone and, in response to the sound being a sound corresponding to a preset control command, performs an operation according to the preset control command.

8. The image forming device of claim 1, wherein each of the sound corresponding to the connection information and the sound corresponding to the error of the image forming job is an inaudible frequency band sound.

9. The image forming device of claim 1, wherein the processor controls the speaker to output a sound corresponding to at least one of device state information associated with the image forming device or consumable state information associated with a consumable unit installed in the image forming device.

10. The image forming device of claim 1, wherein the sound corresponding to the error of the image forming job includes at least one of information about the image forming device, error contents, a solving method, or a service center contact number.

11. An electronic device connectable to an image forming device, the electronic device comprising:
a microphone;
a wireless communication unit; and
a processor to, in response to a sound corresponding to connection information necessary for connection to the image forming device being recorded through the microphone,
extract the connection information by analyzing the recorded sound, and
transmit a wireless connection request to the image forming device by using the extracted connection information to form a wireless connection between the image forming device and the electronic device,
wherein, in response to an error of an image forming job occurring in the image forming device, the microphone receives a sound corresponding to the error of the image forming job in a preset frequency band output by the image forming device, and
wherein the connection information includes address information on a uniform resource locator (URL) comprising a Media Access Control (MAC) address of the image forming device, a Personal Identification Number (PIN), and a password set by a user.

12. The electronic device of claim 11, wherein the microphone receives a sound corresponding to at least one of device state information associated with the image forming device or consumable state information associated with a consumable unit installed in the image forming device.

13. The electronic device of claim 11, wherein the sound corresponding to the error of the image forming job includes at least one of information about the image forming device, error contents, a solving method, or a service center contact number.

14. A wireless connection method of an image forming device, the wireless connection method comprising:
in case of a preset condition, outputting, through a speaker, a sound corresponding to connection information necessary for connection to the image forming device in a preset frequency band supported by the speaker;
in response to a wireless connection request with respect to the connection information being received from an electronic device receiving the sound, forming a wireless connection with the electronic device which transmits the wireless connection request;
in response to data being received from the electronic device through the formed wireless connection, outputting the received data by the image forming device; and
in response to an error of an image forming job occurring in the image forming device, outputting, through the speaker, a sound corresponding to the error of the image forming job in a preset frequency band supported by the speaker,
wherein the connection information includes address information on a uniform resource locator (URL) comprising a Media Access Control (MAC) address of the image forming device, a Personal Identification Number (PIN), and a password set by a user.

15. The wireless connection method of claim 14, wherein the outputting of the sound corresponding to the connection information comprises, if at least one of power of the image forming device is turned on, a user command of an output of the connection information is input, or a period associated with the output of the connection information elapses, outputting, through the speaker, the sound corresponding to the connection information.

16. The wireless connection method of claim 14, wherein the outputting of the sound corresponding to the connection information comprises, if the wireless connection request is not received for a preset time after initially outputting the sound corresponding to the connection information through the speaker, outputting the sound corresponding to the connection information by increasing a volume level of the sound corresponding to the connection information.

17. The wireless connection method of claim 14, further comprising outputting a sound, through the speaker, corresponding to at least one of device state information associated with the image forming device or consumable state information associated with a consumable unit installed in the image forming device.

18. The wireless connection method of claim 14, wherein the sound corresponding to the error of the image forming job includes at least one of information about the image forming device, error contents, a solving method, or a service center contact number.

* * * * *